United States Patent

Takeuchi et al.

[11] Patent Number: 5,597,661
[45] Date of Patent: Jan. 28, 1997

[54] SOLID POLYMER ELECTROLYTE, BATTERY AND SOLID-STATE ELECTRIC DOUBLE LAYER CAPACITOR USING THE SAME AS WELL AS PROCESSES FOR THE MANUFACTURE THEREOF

[75] Inventors: Masataka Takeuchi; Koji Tokita; Miyuki Ueda; Jun Noguchi, all of Chiba; Hideo Yashima, Ichihara, all of Japan

[73] Assignee: Showa Denko K.K., Tokyo, Japan

[21] Appl. No.: 343,603

[22] PCT Filed: Jun. 3, 1994

[86] PCT No.: PCT/JP94/00903

§ 371 Date: Jan. 30, 1995

§ 102(e) Date: Jan. 30, 1995

[87] PCT Pub. No.: WO94/29884

PCT Pub. Date: Dec. 22, 1994

[30] Foreign Application Priority Data

| Oct. 23, 1992 | [JP] | Japan | 4-286325 |
| Jun. 3, 1993 | [JP] | Japan | 5-133620 |
| Nov. 29, 1993 | [JP] | Japan | 5-323192 |
| Nov. 29, 1993 | [JP] | Japan | 5-323193 |
| Mar. 4, 1994 | [JP] | Japan | 6-060067 |
| May 24, 1994 | [JP] | Japan | 6-133839 |

[51] Int. Cl.$^6$ ........................... H01H 6/18
[52] U.S. Cl. ............ 429/42; 429/191; 429/213; 429/218; 29/623.1; 252/62.2; 252/500; 252/518
[58] Field of Search ............ 429/191, 192, 429/213, 218; 29/623.1; 361/212, 301.1, 305, 306.3, 311; 252/62.2, 500, 518

[56] References Cited

U.S. PATENT DOCUMENTS

| 4,357,401 | 11/1982 | Andre et al. . |
| 4,792,504 | 12/1988 | Schwab et al. . |
| 5,223,353 | 6/1993 | Kawasaki et al. . |
| 5,332,631 | 7/1994 | Abraham et al. | 429/48 |
| 5,376,478 | 12/1994 | Nakacho et al. | 429/192 |
| 5,378,381 | 1/1995 | Takahashi et al. | 429/192 |

FOREIGN PATENT DOCUMENTS

| 0315876 | 5/1989 | European Pat. Off. . |
| 63-244570 | 10/1988 | Japan . |
| 4253771 | 9/1992 | Japan . |
| 9304507 | 3/1993 | WIPO . |

OTHER PUBLICATIONS

Wright, "Electrical Conductivity in Ionic Complexes of Poly(ethylene oxide)" *Br. Polym. J.*, 7:319–327 (1975) (month N/A).

Kobayashi et al, "Ionically High Conductive Solid Electrolytes Composed of Graft Copolymer–Lithium Salt Hybrids", *J. Phys. Chem.*, 89:987–991 (1985) (month N/A).

(List continued on next page.)

*Primary Examiner*—M. Nuzzolillo
*Attorney, Agent, or Firm*—Sughrue, Mion, Zinn, Macpeak & Seas

[57] ABSTRACT

A solid polymer electrolyte comprising a composite of (a) a polymer comprising 2-(meth)acryloyloxyethylcarbamic acid ester and (b) an electrolyte salt, which has a high ionic conductivity and can be made into a thin film. The present invention is also directed to an electrode comprising the solid polymer electrolyte and an electroactive substance or polarizable material; as well as a process for manufacturing the same. In addition, the present invention is directed to primary and secondary batteries having the solid polymer electrolyte, as well as a process for manufacturing the same. The battery according to the present invention has a high capacity, high current density, and further in the case of a secondary battery, good cyclability. Finally, the present invention is directed to a solid-state electric double layer capacitor comprising the solid polymer electrolyte, as well as a process for manufacturing the same. The electric double layer capacitor has a high output voltage and a large take-out current.

30 Claims, 2 Drawing Sheets

OTHER PUBLICATIONS

Llompart et al, "Oxygen Regeneration of Discharged Manganese Dioxide Electrode", *J. Electrochem. Soc.*, 138(3):665–669 (1991) (month N/A).

Russell, "In Situ Infrared Study of the Electrosorption of $HSO_4$ on Metal Electrodes", *The 173rd Electrochemical Society Meeting Atlanta Georgia*, 135(3):332 (1988) (month N/A).

Blonsky et al, "Polyphosphazene Solid Electrolytes", *J. Am. Chem. Soc.*, 106:6854–6855 (1984).

Ziaryo, *Material Report R&D*, pp. 33–41 (Feb. 1989).

Nakajima et al, "Structure and Charge–discharge Mechanism of Poly–aniline", *The 27th Symposium on Battery*, 3A05L–3A06L (1986) (month N/A).

SOLID POLYMER ELECTROLYTE, BATTERY AND SOLID-STATE ELECTRIC DOUBLE LAYER CAPACITOR USING THE SAME AS WELL AS PROCESSES FOR THE MANUFACTURE THEREOF

TECHNICAL FIELD

The present invention relates to a solid polymer electrolyte having high ionic conductivity using a polymer having an oxyalkyl side chain that contains urethane bonding; an electrode comprising such a polymer and a process for manufacturing the same; a battery comprising such a solid polymer electrolyte or such an electrode and a process for manufacturing the same; and an electric double layer capacitor using such a solid polymer electrolyte and a process for manufacturing the same.

BACKGROUND ART

In the field of ionics, there is a trend of down-sizing as well as making it to be of the solid-state type, and efforts are being made extensively with view to application, to solid-state primary or secondary batteries and electric double layer capacitors, of solid electrolytes as a new ionic conductor which replaces conventional electrolyte solutions. Conventional batteries with electrolyte solutions have problems in long-term reliability since there tends to occur leakage of the electrolyte solution out of the parts or elution of the electrode substance. On the contrary, products with solid electrolytes do not cause such problems and it is easy to make their thickness smaller. Furthermore, solid electrolytes are excellent in thermal resistance and advantageous in the manufacturing process of products such as battery.

Among batteries using a solid electrolyte, those using a polymer as a main component of the electrolyte have a merit of increased flexibility as compared with those using an inorganic substance, which endows the former with processability into various forms. However, such products as hitherto studied still suffer from a problem that only a small amount of current can be taken out since the solid polymer electrolyte has a low ionic conductivity.

As an example of such solid polymer electrolyte, it is described in British Polymer Journal (Br. Polym. J.), 7: 319–327 (1975) that a compounded material consisting of a polyethylene oxide and an inorganic alkali metal salt exhibits ionic conductivity, which is, however, as low as $10^{-7}$ S/cm at room temperature.

Recently, there have been many reports that a comb-shaped polymer having an oligooxyethylene in its each side chain has an improved ionic conductivity due to increased thermal motion of the oxyethylene chain which contributes ionic conductivity. An example in which polymethacrylic acid with oligooxyethylene being added to its side chain is compounded with an alkali metal salt is described in Journal of Physical Chemistry (J. Phys. Chem.), vol. 89, page 987 (1985). Another example in which polyphosphazene with an oligooxyethylene side chain is compounded with an alkali metal salt is described in Journal of American Chemical Society (J. Am. Chem. Soc.), vol. 106, page 6854 (1984).

Recently, many studies have been made on lithium secondary batteries in which metal oxides or metal sulfides such as $LiCoO_2$, $LiNiO_2$, $LiMnO_2$, $MOS_2$ and the like are used as positive electrode. For example, batteries using positive electrode made of MnO2 or NiO2 are reported in Journal of Electrochemical Society (J. Electrochem. Soc.), vol. 138 (No. 3), page 665 (1991). These batteries have drawn attention since they have high gravimetric or volumetric capacity.

Also, many reports have been made on batteries using electroconductive polymer as electroactive material. For example, lithium secondary battery using polyanilines as positive electrode has already been put on the market in the form of a coin type battery for use as a backup source by Bridgestone Co., Ltd. and Seiko Co., Ltd. as reported in, for example, "The 27th Symposium on Battery 3A05L and 3A06L" (1986). Polyaniline also attracts attention as an electroactive material for positive electrode having a high capacity and flexibility.

Lately, electric double layer capacitors which comprise polarizable electrodes made of a carbon material having a large specific area such as activated carbon, carbon black or the like and an ionic conducting solution arranged between the electrodes have been widely used for a memory backup source. For Example, a capacitor having carbon-based polarizable electrodes and an organic electrolyte solution is described in "Kinou Zairyo", February 1989, page 33. An electric double layer capacitor using an aqueous sulfuric acid solution is described in "The 173rd Electrochemical Society Meeting Atlanta Ga.", May, No. 18 (1988). Also, a capacitor using highly electroconductive $Rb_2Cu_3I_3Cl_7$ as an inorganic solid electrolyte is disclosed in Japanese Patent Application Laid-open No. 63-244570 (1988).

However, electric double layer capacitors using conventional electrolyte solutions have problems in long-term use and reliability since there tends to occur leakage of the solution out of the capacitor when used for a long time or when a high voltage is applied to. On the other hand, electric double layer capacitors using conventional inorganic based ionic conducting substances have a problem that the ionic conducting substance decomposes at a low voltage and, hence, the output voltage is low.

The use of an ionic conducting substance using a polyphosphazene based polymer for a capacitor is disclosed in Japanese Patent Application Laid-open No. 4-253771 (1992). The capacitor using such an ionic conducting substance containing a polymer as the main component has various merits that it has an output voltage higher than the inorganic substance based ionic conducting substance, can be processed into various forms and is easy to be sealed.

In this case, however, the ionic conductivity of the solid polymer electrolyte as low as $10^{-4}$ to $10^{-6}$ S/cm is still unsatisfactory and there is also a defect that the take-out current is small. Although it is possible to increase the ionic conductivity of the solid polymer electrolyte by the addition of a plasticizer, this gives fluidity to the electrolyte, which means that the electrolyte can no longer be treated as a complete solid. As a result, the film made of the polymer has a poor film strength and the polymer has a poor film formability and, hence, not only short-circuit tends to occur when the polymer is used in an electric double layer capacitor or a battery but also there arises a difficulty in sealing as in the case of the liquid ionic conducting substances. In addition, when it is assembled with a polarizable electrode such as a carbon material to produce a capacitor, there arises a problem of homogeneously compounding the solid polymer electrolyte with a carbon material having a large specific surface area since the both materials are solid and hard to be homogeneously compounded.

The ionic conductivity of solid polymer electrolytes studied so far has been improved up to about $10^{-4}$ to $10^{-5}$ S/cm, which is, however, by over two digits lower than that of the liquid ionic conducting substances. Besides, at a temperature no higher than 0° C., the ionic conductivity decreases drastically to a further lower level. Furthermore, when these solid electrolytes are incorporated in a device such as an electric double layer capacitor or incorporated in a battery in the form of a thin film, there arises difficulties in the manufacturing process since the solid electrolyte is hard to be compounded with the electrode and it is difficult to achieve a satisfactory contact between the electrolyte and the electrode.

OBJECT OF THE INVENTION

It is an object of the present invention to provide a solid polymer electrolyte which has a good strength when molded into a film, has high ionic conductivities at room temperature as well as at low temperatures and is excellent in processability.

It is also an object of the present invention to provide, using such a solid polymer electrolyte, primary and secondary batteries which are easy to be made in the form of a thin film, can operate at high capacity and at high voltage, and further have good cyclability and good reliability.

Also, it is an object of the present invention to provide an electrode having a high electrochemical activity and flexibility as well as to provide secondary batteries using the same.

Another object of the present invention is to provide an electrode usable in electric double layer capacitors which has a good polarizability, a good strength when formed into a film and a good contactibility with solid electrolyte.

Further another object of the present invention is to provide an electric double layer capacitor which gives a high output voltage, a high take-out current, and is excellent in processability and reliability utilizing a solid polymer electrolyte which has a high ionic conductivity at room temperature as well as at a lower temperature, and is excellent in film strength and processability.

SUMMARY OF THE INVENTION

The present inventors have found that a solid polymer electrolyte having a good film strength when processed into a film and a high ionic conductivity can be obtained by using a polymer which has a side chain containing oxyalkyl group and introducing a urethane bonding to said side chain. Here and through the description of this specification, the term "oxyalkyl" includes oligooxyalkylene and polyoxyalkylene, each containing at least one oxyalkylene group and the term "side chain" includes cross-linking side chain.

Further, the present inventors have found that the use of the above solid polymer electrolyte in batteries improves ionic conductivity, film strength, processability, etc., solving the above-mentioned problems of the conventional art.

The present inventors have investigated considering that it is important to provide the electrode in the form of a thin film when, for example, fabricating a thin solid-state battery using such a solid polymer electrolyte, forwarded investigation and found that the use of electroconductive polyaniline and its derivatives which are excellent electroactive substances, specifically, polyaniline or its derivatives soluble in organic solvents or other electroconductive polymers, metal oxides, metal sulfides, carbon materials or other electroactive substances (positive electrode materials or negative electrode materials) in combination with a polymer which has an oxyalkyl side chain containing urethane bonding makes it possible to form an electrode having a high electrochemical activity and flexibility and furthermore it enables manufacturing of electrode in the form of a thin film by solvent cast method or other suitable method without deteriorating the electrochemical activity of the above electroactive substances.

Throughout this specification and the claims annexed thereto, polyaniline and its derivatives are generally or collectively referred to as "an aniline-based polymer" for short (in the singular) or "aniline-based polymers" for short (in the plural).

Still further, the present inventors have found that the use of such carbon materials as will be mentioned later which can be used as a polarizable electrode in an electric double layer capacitor in combination with a polymer which has an oxyalkyl side chain containing urethane bonding makes it possible to form a polarizable electrode suitable for the use of such a capacitor and furthermore it enables manufacturing of electrode in the form of thin film by solvent cast method or other suitable method.

Still further, the present inventors have found that the use of the above-mentioned solid polymer electrolyte gives rise to an electric double layer capacitor which has a high output voltage and a high take-out current, and is excellent in processability and reliability, and inter alia enables manufacturing of a solid-state electric double layer capacitor.

In order to achieve the above-described object, the present invention provides:

1) A solid polymer electrolyte comprising a composite of:
   (a) a polymer obtained from at least one compound selected from the group consisting of 2-acryloyloxyethylcarbamic acid ester (hereinafters referred to as "ACE" for short) and 2-methacryloyloxyethylcarbamic acid ester (hereinafter, referred to as "MCE" for short) represented by a general formula (I) below:

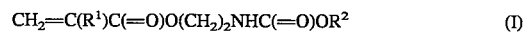
   $$CH_2=C(R^1)C(=O)O(CH_2)_2NHC(=O)OR^2 \qquad (I)$$

wherein
   $R^1$ represents a hydrogen or a methyl group; and
   $R^2$ represents an organic chain containing at least one oxyalkylene group and said organic chain may be linear, branched or cyclic and may contain one or more atoms other than carbon, hydrogen or oxygen
   and/or a copolymer comprising at least one of said compounds as a co-monomer (hereinafter, said polymer and copolymer will be generally referred to as "(M)ACE polymer" for short); and
   (b) at least one electrolyte, 2) A solid polymer electrolyte comprising a composite of:
   (a) a polymer obtained from at least one compound selected from the group consisting of:
      (i) 2-methacryloyloxyethylcarbamic acid ω-alkylooligooxyalkyl ester (hereinafter, referred to as "MCOA" for short), 2-acryloyloxyethylcarbamic acid ω-alkyloligooxyalkyl ester (hereinafter, referred to as "ACOA" for short), 2-methacryloyloxyethylcarbamic acid 2-methacryloyloxyethylcarbamoyloligooxyalkyl ester (hereinafter, referred to as "MCMC" for short), 2-acryloyloxyethylcarbamic acid 2-acryloyloxyethylcarbamoyloligooxyalkyl ester (hereinafter, referred to as "ACAC" for short), and 2-acryloyloxyethylcarbamic acid 2-methacryloyloxyethylcarbamoyloligooxyalkyl ester (hereinafter, referred to as "ACMC" for short), represented by a general formula (II) below:

$$CH_2=C(R^1)C(=O)O(CH_2)_2NHC(=O)O(R^3O)_nR^4 \quad (II)$$

wherein
$R^1$ represents a hydrogen or a methyl group;
$R^3$ represents —$(CH_2)_2$— or —$CH(CH_3)CH_2$—;
$R^4$ represents an alkyl group having 1 to 10 carbon atoms, —$C(=O)NH(CH_2)_2OC(=O)CH=CH_2$ or —$C(=O)NH(CH_2)_2OC(=O)C(CH_3)=CH_2$; and
n is an integer of 1 or more; or
(ii) a compound represented by general formula (III) below:

$$CH_2=C(R^1)C(=O)O(CH_2)_2NHC(=O)O\{(R^6O)_mC(=O)\text{-}NHR^5NHC(=O)O\}_k(R^3O)_nR^4 \quad (III)$$

wherein
$R^1$ represents a hydrogen or a methyl group;
$R^3$ and $R^6$ independently represents —$(CH_2)_2$— or —$CH(CH_3)CH_2$—;
$R^4$ represents an alkyl group having 1 to 10 carbon atoms, —$C(=O)NH(CH_2)_2OC(=O)CH=CH_2$ or —$C(=O)NH(CH_2)_2OC(=O)C(CH_3)=CH_2$;
$R^5$ represents an alkylene, allylene, arylene or oxyalkylene group having 1 to 20 carbon atoms; and
n, m and k respectively represents an integer of 1 or more;
and/or a copolymer comprising at least one of said compounds (i) and (ii) as a co-monomer; and
(b) at least one electrolyte, 3) The solid polymer electrolyte described in above 1) or 2), wherein said electrolyte (b) is at least one compound selected from an alkali metal salt, a quaternary ammonium salt, a quaternary phosphonium salt and a transition metal salt, 4) The solid polymer electrolyte described in any of above 1) through 3), wherein said solid polymer electrolyte further contains a plasticizer, 5) A battery which comprises the solid polymer electrolyte described in any of above 1) through 4), 6) A lithium battery which comprises the negative electrode comprising lithium or lithium alloy and a solid polymer electrolyte described in any of above 1) through 4), 7) A lithium ion battery which comprises the negative electrode comprising a carbon material which can occlude and discharge lithium ion and a solid polymer electrolyte described in any of above 1) through 4), 8) A battery which comprises the positive electrode comprising the electrode comprising an aniline-based polymer soluble in an organic solvent or other electroconductive polymer, a metal oxide, a metal sulfide or a carbon material and the solid polymer electrolyte described in any of above 1) through 4) is comprised, 9) An electrode comprising a (M)ACE polymer and an electroactive substance or a polarizable material.

10) An electrode comprising a polymer obtained from at least one compound selected from MCOA, ACOA, MCMC, ACAC, ACMC or a compound represented by general formula (III) and/or a copolymer comprising at least one of said compounds as a co-monomer and an electroactive substance, or a polarizable material.

11) The electrode described in above 9) or 10), wherein said electroactive substance or polarizable material comprises an aniline-based polymer soluble in an organic solvent or other electroconductive polymer, a metal oxide, a metal sulfide or a carbon material, 12) A process for manufacturing an electrode which comprises a step of polymerizing a polymerizable monomer mixture comprising at least one compound selected from ACE and MCE and at least one electroactive substance or polarizable material, without or with an optionally-added plasticizer, 13) A process for manufacturing an electrode which comprises a step of polymerizing a polymerizable monomer mixture comprising at least one compound selected from MCOA, ACOA, MCMC, ACAC, ACMC or a compound represented by general formula (III) and an electroactive substance or a polarizable material, without or with an optionally-added plasticizer, 14) A process for manufacturing an electrode described in above 12) or 13), wherein the electroactive substance or a polarizable material comprises an aniline-based polymer soluble in an organic solvent or other electroconductive polymer, a metal oxide, a metal sulfide or a carbon material, 15) A process for manufacturing a battery which comprises steps of placing a polymerizable monomer mixture in a frame for construction of a battery or on a support, said mixture comprising at least one compound selected from ACE or MCE, at least one electrolyte and optionally a plasticizer, and polymerizing said polymerizable monomer mixture, 16) A process for manufacturing a battery which comprises steps of placing a polymerizable monomer mixture in a frame for construction of a battery or on a support, said mixture comprising at least one compound selected from MCOA, ACOA, MCMC, ACAC, ACMC or a compound represented by general formula (III) and at least one electrolyte and optionally a plasticizer, and polymerizing said polymerizable monomer mixture, 17) An electric double layer capacitor comprising polarizable electrodes and an ionic conductive substance arranged between the electrodes, wherein the ionic conducting substance comprises the solid polymer electrolyte described in any of above 1) through 4), 18) The electric double layer capacitor comprising polarizable electrodes and an ionic conducting substance arranged between the electrodes, wherein the polarizable electrodes comprises a carbon material and above-mentioned (M)ACE polymer, 19) The electric double layer capacitor comprising polarizable electrodes and an ionic conducting substance arranged between the electrodes, wherein the polarizable electrodes comprise a carbon material and a polymer obtained from at least one compound selected from MCOA, ACOA, MCMC, ACAC, ACMC or a compound represented by the general formula (III) and/or a copolymer comprising said compound as a co-monomer, 20) The electric double layer capacitor comprising polarizable electrodes and an ionic conducting substance arranged between the electrodes, wherein the polarizable electrodes are those manufactured by polymerizing a polymerizable monomer mixture comprising a carbon material and at least one compound selected from ACE or MCE, 21) The electric double layer capacitor comprising polarizable electrodes and an ionic conducting substance arranged between the electrodes, wherein the polarizable electrodes are those manufactured by polymerizing a polymerizable monomer mixture comprising a carbon material and at least one compound selected from MCOA, ACOA, MCMC, ACAC, ACMC or a compound represented by the general formula (III), 22) A process for manufacturing an electric double layer capacitor which comprises steps of placing a polymerizable monomer mixture in a frame for construction of an electric double layer capacitor or on a support, said mixture comprising at least one compound selected from ACE or MCE, at least one electrolyte and optionally a plasticizer, and polymerizing said polymerizable monomer mixture, 23) A process for manufacturing an electric double layer capacitor which comprises steps of placing a polymerizable monomer mixture in a frame for construction of an electric double layer capacitor or on a support, said polymerizable mixture comprising at least one compound selected from MCOA, ACOA, MCMC, ACAC, ACMC or a compound represented by the general formula (III), at least one electrolyte and optionally a plasticizer, and polymerizing said polymerizable monomer mixture, and 24) A process for manufacturing an electric double layer capacitor which comprises steps of arranging a pair of polarizable electrodes comprising a carbon material and above-mentioned (M)ACE polymer so as to face each other; placing in between said facing electrodes a polymerizable monomer mixture comprising at least one compound selected from ACE or MCE, at least one electrolyte and optionally a plasticizer; and polymerizing said polymerizable monomer mixture.

Thus the above-mentioned objects have been achieved by developing these (1) to (24). Incidentally, the term "oligooxyalkyl" in the definitions of MCOA, ACOA, MCMC, ACAC and ACMC throughout this specification and the claims annexed thereto represents oxyalkylene chain containing at least one divalent unit selected from —$CH_2CH_2O$— or —$CH(CH_3)CH_2O$—.

DETAILED DESCRIPTION OF THE INVENTION

Figure 1:
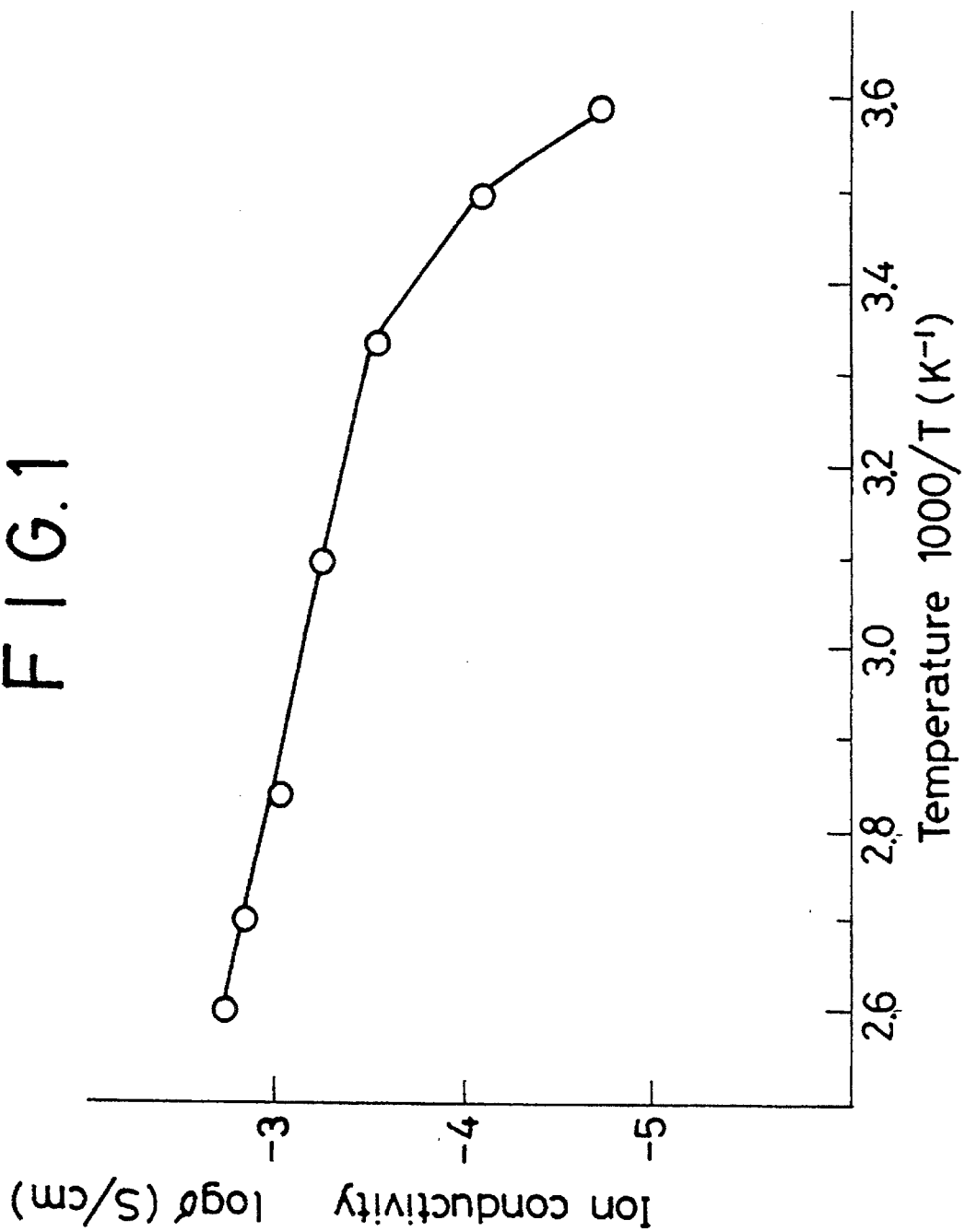
FIG. 1 is a graph illustrating a temperature dependence of ionic conductivity of the film made of solid polymer electrolyte prepared in Example 13 of the present invention.

Hereinafter, the present invention will be described in more detail.

Examples of the compounds ACE and MCE represented by the above general formula (I) used in the present invention are compounds having one polymeriable group such as MCOA, ACOA, etc., compounds having plural polymerizable groups such as MCMC, ACAC, ACMC, etc., each represented by the above general formula (II), compounds having plural urethane groups as represented by the general formula (III), or compounds containing cyclic oxyalkylene groups such as compounds having a crown ether as $R^2$ in the above general formula (I).

ACE and MCE represented by the general formula (I) each of which is a monomer to prepare the above-mentioned (M)ACE polymer and ACOA and MCOA represented by the general formula (II) can be obtained by the following reaction schemes. In the following reaction schemes, $R^1$, $R^3$, and $R^4$ each means the same as defined in the general formula (II).

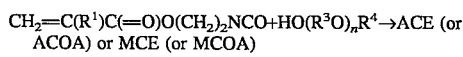

For example, MCOA and ACOA can be readily obtained by reacting 2-methacryloyloxyethylisocyanate (hereinafter, referred to as "MOI" for short) or 2-acryloyloxyethylisocyanate (hereinafter, "AOI" for short) with monoalkylalkylene glycol. MCMC, ACAC or ACMC represented by the general formula (II) can be obtained readily by reacting MOI and/or AOI with oligoalkylene glycol in a molar proportion of 2:1.

The compounds having plural urethane groups represented by the general formula (III) can also be obtained, for example, by reacting k mole of a compound having two isocyanate groups such as hexamethylenediisocyanate and tolylenediisocyanate with (2k–j) mole of alkylene glycol and j mole of monoalkylalylene glycol to obtain j mole of product and then reacting the thus obtained product with the same mole of the above MOI or AOI according to the following two reaction schemes. In the following reaction schemes, $R^3$, $R^4$, $R^5$, $R^6$, k, m and n each means the same as defined in the general formula (III) and each of j and (2k–j) is a positive number.

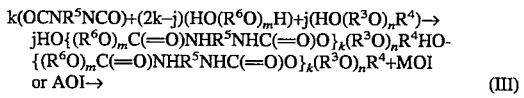

Incidentally, it should be noted that the term "alkylene glycol" includes oligoalkylene glycol and polyalkylene glycol in the specification and likewise that the term "monoalkylalkylene glycol" includes monoalkyloligoalkylene glycol and monoalkylpolyalkylene glycol.

Among the compounds represented by the general formula (I), the compounds represented by the general formula (II) are preferred since they enable more urethane groups and oxyalkylene groups to be introduced in the side chain of the obtained polymer.

The above-mentioned (M)ACE polymer comprised by the solid polymer electrolyte of the present invention can be obtained by polymerizing at least one compound selected from ACE or MCE represented by the general formula (I) or performing polymerization using such a compound as a co-monomer.

For polymerization, there can be adopted general methods which utilize polymerizing properties of the acryloyl or methacryloyl group in these monomers. That is, at least one compound selected from these monomers, or such monomers and other polymerizable compounds such as a methacrylic acid (or acrylic acid) esters, acrylamide, N-vinylacetamide, styrene and the like are mixed together, and are then radically, anionically or cationically polymerized using a radical polymerization catalyst such as azobisisobutyronitrile, benzoyl peroxide, etc., a cation polymerization catalyst such as a protonic acid such as $CF_3COOH$, etc., Lewis acids such as $BF_3$, $AlCl_3$ and the like, or an anion polymerization catalyst such as butyllithium, respectively, sodium naphthalene, lithium alkoxide and the like. Polymerization can also be performed after forming the polymerizable monomer mixture into a shaped article such as a film or the like. In the case where a (M)ACE polymer is used as a solid polymer electrolyte as in the present invention, it is particularly advantageous to polymerize such a polymerizable monomer mixture after the film formation.

That is, at least one compound selected from ACE or MCE, for example, MCOA, ACOA, MCMC, ACAC and ACMC and at least one electrolyte such as an alkali metal salt, a quaternary ammonium salt, a quaternary phosphonium salt or a transition metal salt, with or without optionally adding thereto (i) further another polymerizable compound and/or (ii) a plasticizer and/or (iii) a solvent, are mixed together, and then the resulting polymerizable monomer mixture is polymerized in the presence of or in the absence of such a catalyst as described above optionally with heat and/or electromagnetic radiation such as light to form a polymer. Especially, there can be obtained a wider freedom in processing, thus giving a great merit in application by such a process as comprising forming said polymerizable monomer mixture in shaped article such as a film and then polymerizing the same, for example, with heat and/or electromagnetic radiation such as light to give a polymer film.

Any solvent that does not hinder the polymerization may be used, depending on the kind of the compound represented by the general formula (I) and the presence of a catalyst. An example of the usable solvent includes tetrahydrofuran, acetonitrile, toluene, etc.

The temperature for heat polymerization may vary as far as it may suffice to occur polymerization reaction. It depends on the kind of the compound represented by the general formula (I) and usually a temperature of 0° to 200° C. is sufficient. Though, the conditions of polymerization with electromagnetic radiation may vary depending on the kind of the compound represented by the general formula (I), it is possible to perform polymerization with ultraviolet ray or γ ray of at least several mW using an initiator such as benzylmethylketal or benzophenone as an example.

A (M)ACE polymer used as a solid polymer electrolyte in the present invention may be, as mentioned above, a homopolymer of ACE or MCE represented by the general formula (I), a copolymer comprising at least two compounds selected from ACE and/or MCE, or a copolymer comprising at least one compound selected from ACE and MCE and another polymerizable compound. The polymer to be used as a solid polymer electrolyte in the present invention may be also a mixture of such a (M)ACE polymer and other polymers. For example, a mixture of a (M)ACE polymer and a polymer such as polyethylene oxide, polyacryronitrile, polybutadiene, polymethacrylic (or polyacrylic) acid esters, polyphosphazenes, polysiloxanes, polysilanes or polystyrene can be used as a solid polymer electrolyte of the present invention. The amount of structural units derived from ACE or MCE represented by the general formula (I) in the above polymer or polymer mixture is preferably not lower than 20% by weight, which is a sufficient value for the polymer to exhibit characteristics of urethane bonding contained therein, not lower than 50% by weight being more preferred.

The molecular weight of the (M)ACE polymer used in the solid polymer electrolyte of the present invention is preferably not lower than 1,000 but not higher than 1,000,000, and more preferably not lower than 5,000 but not higher than 50,000. If the molecular weight of the polymer increases, the film properties such as the film strength after processing are improved, while in contrast the thermal motion, which is important to carrier ion migration, is restricted, thereby decreasing the ionic conductivity of the film and making the film less soluble or difficult to dissolve in solvents, which is disadvantageous from viewpoint of processability. On the contrary, too low a molecular weight deteriorates film formability and film strength so that the resulting film has poor fundamental physical properties.

Of the monomers used for preparing the (M)ACE polymer used in the solid polymer electrolyte of the present invention, MCOA and ACOA give rise to comb-shaped polymers since each of them has one polymerizable group while MCMC, ACAC and ACMC give rise to network-form polymers since each of them has two polymerizable groups. Therefore, polymers which exhibit high thermal mobilities and have good film strength can be obtained by appropriately mixing these monomers. The number of oxyalkylene chains in an oxyalkyl group which constitutes side chains of the polymer, i.e. the number of oxyalkylene groups contained in $R^2$ of the above general formula (I) or, for example, the value of n in the above general formula (II), or the value of m×k+n in the above general formula (III), is preferably within the range of 1 to 1,000, and more preferably 5 to 50.

An organic compound may preferably added as a plasticizer in the solid polymer electrolyte of the present invention, which increases the ionic conductivity of the electrolyte. As the organic compound to be added, those compounds are suitable that have good compatibility with the M(ACE) polymer, high dielectric constant, a boiling point of not lower than 100° C. and a wide range of electrochemical stability. Examples of the plasticizer include oligoethers such as triethylene glycol methyl ether and tetraethylene glycol dimethyl ether, carbonates such as ethylene carbonate, propylene carbonate, diethyl carbonate and vinylene carbonate, aromatic nitriles such as benzonitrile and tolunitrile, dimethylformamide, dimethylsulfoxide, N-methylpyrrolidone and N-vinylpyrrolidone, sulfur compounds such as sulfolane, phosphoric acid esters, etc. Among these, oligoethers and carbonates are preferred, with carbonates being particularly preferred.

The more the amount of the plasticizer added, the higher the ionic conductivity of the solid polymer electrolyte. However, if the amount of the plasticizer is too much, the mechanical strength of the solid polymer electrolyte decreases. Preferred amount of the plasticizer added is at most 5 times as much as the weight of the (M)ACE polymer. The amount of addition can be increased without decreasing the mechanical strength while improving the ionic conductivity by effecting copolymerization of ACE or MCE and the like with polymerizable compounds such as vinylene carbonate, N-vinylpyrrolidone in appropriate combination with non-polymerizable plasticizer.

Proportion of the electrolyte to be compounded with the (M)ACE polymer in the solid polymer electrolyte of the present invention is preferably 1 molecule of electrolyte to 2 to 100 ether oxygen atoms in the side chain. If the electrolyte to be compounded exists in a proportion of 1/2 or more molecules with respect to an ether oxygen atom, migration of ions is significantly inhibited. On the contrary, the proportion of the electrolyte not above 1/100 molecule is undesirable since the absolute amount of ions is insufficient and decrease the ionic conductivity.

The above compounding ratio of the electrolyte is more preferably 1 molecule of electrolyte to 4 to 100 ether oxygen atoms in the side chain. If the electrolyte to be compounded exists in a proportion of 1/4 or more molecules with respect to an ether oxygen atom, migration of ions is inhibited. On the contrary, the proportion of the electrolyte not above 1/100 molecule is undesirable since the absolute amount of ions is insufficient and decrease the ionic conductivity.

The kind of the electrolyte used for compounding is not limited particularly, and any electrolyte which contains the ion desired to be used as the carrier in the solid polymer electrolyte can be used. However, it is desirable that the dissociation constant of the electrolyte in the compounding polymer is large, and in this respect the electrolyte recommended are alkali metal salts, quaternary ammonium salts such as $(CH_3)_4NBF_4$, etc., quaternary phosphonium salts such as $(CH_3)_4PBF_4$, etc., transition metal salts such as $AgClO_4$, etc., or protonic acids such as hydrochloric acid, perchloric acid, tetrafluoroboric acid, etc.

As the electroactive substance for negative electrode used in the battery of the present invention, preferred are, as discussed later in this specification, those in which alkali metal ions function as the carrier and have low redox potential such as alkali metals, alkali metal alloys, carbon materials, etc. since high voltage, high capacity batteries can be obtained when they are used. Therefore, when applied to the batteries comprising such a negative electrode and the carrier of alkali metal ions, alkali metal salts are required as the electrolyte in the solid polymer electrolyte. Examples of the alkali metal salt includes, for example, $LiCF_3SO_3$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$, $KI$, etc. Among them, the most preferred alkali metal is lithium or lithium alloy since when it is used, there can be obtained a battery which has a high voltage and a high capacity and which can be formed into a thin film. In the case of a negative electrode comprising a carbon material, there can be used not only alkali metal ions but also quaternary ammonium salts, quaternary phosphonium salts, transition metal salts, and various protonic acids.

In the case of a solid-state electric double layer capacitor, the kind of the electrolyte to be used for compounding therein is not limited particularly, and it is sufficient to use a compound which contains the ion desired to be used as the electric carrier. However, it is desirable that the compound contains ions which have a large dissociation constant in the compounding polymer and which readily form electric double layer together with polarizable electrode. Examples of such a compound are quaternary ammonium salts such as $(CH_3)_4NBF_4$, $(CH_3CH_2)_4ClO_4$, etc., transition metal salts such as $AgClO_4$, etc., quaternary phosphonium salts such as $(CH_3)_4PBF_4$, etc., alkali metal salts such as $LiCF_3SO_3$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$, $KI$, etc., organic acids such as p-toluenesulfonic acid, etc., and salts thereof, inorganic acids such as hydrochloric acid, sulfuric acid, etc. Among them, quaternary ammonium salts, quaternary phosphonium salts and alkali metal salts are preferred in view of higher output voltage and larger dissociation constant. Among the quaternary ammonium salts, those having different substituent groups on the nitrogen in the ammonium ion such as $(CH_3CH_2)(CH_3CH_2CH_2CH_2)_3NBF_4$ are preferred in view of higher solubility in the compounding polymer and larger dissociation constant.

In the frame for construction of a battery of the present invention, it is desirable to use, as the negative electrode, an electroactive substance (negative electrode material) having a low redox potential such as alkali metals alkali metal alloy, carbon materials, etc. in which alkali metal ions function as the carrier since a high voltages high capacity battery can be obtained. Among these electroactive substances, lithium metal or lithium alloys such as lithium/aluminum alloy, lithium/lead alloy, lithium/antimony alloy, etc. are particularly preferred since they have the lowest redox potential. Carbon materials are also particularly preferred for the reason that they have low redox potential when they occlude Li ion and that they are stable and safe. Examples of carbon materials which can occlude Li ion are natural graphite, synthesized graphite, graphite produced by vapor phase process, petroleum cokes, coal cokes, pitch carbon, polyacenes, fullerenes such as $C_{60}$ and $C_{70}$, etc.

In the frame for construction of a battery of the present invention, it is desirable to use, as the positive electrode, electroactive substance (positive electrode material) having a high redox potential such as metal oxides, metal sulfides, electroconductive polymers, or carbon materials, etc. since a high voltage, high capacity battery can be obtained. Among these electroactive substances, metal oxides such as cobalt oxide, manganese oxide, vanadium oxide, nickel oxide, molybdenum oxide, etc., metal sulfides such as molybdenum sulfide, titanium sulfide, vanadium sulfide, etc, are preferred in view of higher packing density and higher volumetric capacity in such an electroactive substance, and particularly, manganese oxide, nickel oxide, cobalt oxide, etc. are particularly preferred in view of a high voltage and high capacity. Electroconductive polymers such as polyaniline is particularly preferred in view of flexibility and ease of making a thin film. Examples of such electroconductive polymers are aniline-based polymers, polyacetylene and its derivatives, poly(p-phenylene) and its derivatives, polypyrrole and its derivatives, polythienylene and its derivatives, polypyridinediyl and its derivatives, polyisothianaphthenylene and its derivatives, polyfurylene and its derivatives, polyselenophenylene and its derivatives, polyarylenevinylene and its derivatives such as poly(p-phenylenevinylene), polythienylenevinylene, polyfurylenevinylene, polynaphthylenevinylene, polyselenophenylenevinylene, polypyridinediylvinylene, etc.

Examples of carbon materials include natural graphite, synthesized graphite, graphite produced by vapor phase process, petroleum cokes, coal cokes, fluorinated graphite, pitch carbon, polyacenes, fullerenes such as $C_{60}$ and $C_{70}$, etc.

Process for preparing metal oxides or metal sulfides are not particularly limited and they may be prepared by conventional electrolysis process or heat process as described in "Denkikagaku", vol. 22, page 574 (1954), for example. When they are used as the electroactive substance in lithium batteries, it is preferred to make lithium atoms, in such a form as $Li_xCoO_2$, $Li_xMnO_2$, etc., inserted in or compounded with metal oxide or metal sulfide in the manufacturing process of batteries. Process for inserting Li atoms is not particularly limited and such an insertion may be performed by electrochemically inserting Li ions or by such a process as described in U.S. Pat. No. 4,357,215 in which a salt like $Li_2CO_3$, etc. is mixed with a metal oxide and then treated with heat.

Electroconductive polymers used for electroactive substances in batteries or electrodes of the present invention are prepared by such chemical or electrochemical processes as described below or any other conventional process.

Carbon materials used for electroactive substances in batteries or electrodes of the present invention may be those commercially available or prepared by any conventional process.

An organic solvent-soluble aniline-based polymer may be used as the electroactive substance of the battery or electrode of the present invention, which is advantageous in that molding can be performed by solution coating and especially advantageous in the fabrication of thin film batteries. Examples of the aniline-based polymers include polyaniline, poly-o-toluidine, poly-m-toluidine, poly-o-anisidine, poly-m-anisidine, polyxylidines, poly-2,5-dimethoxyaniline, poly-2,6-dimethoxyaniline, poly-2,5-diethoxyaniline, poly-2,6-diethoxyaniline, poly-o-ethoxyaniline, poly-m-ethoxyaniline, and copolymers comprising such a monomeric unit as contained in these polymers. However, the present invention is not limited thereto and any polymer containing a repeating unit derived from aniline or its derivatives can be used. The larger the amount of the side chain of the organic solvent-soluble aniline-based polymer, the more convenient in view of higher solubility while as the amount of the side chain increases, but there appears an adverse effect that the gravimetric capacity of the positive electrode gets smaller. Therefore, examples of preferred aniline-based polymers include polyaniline, poly-o-toluidine, poly-m-toluidine, poly-o-anisidine, poly-m-anisidine, polyxylidines, etc.

While the polymerization method for producing polyaniline or its derivatives to be adopted in the present invention is not limited particularly, generally there is used a method in which an aniline or aniline derivative such as o-anisidine, or the like is subjected to oxidative polymerization electrochemically or chemically, as reported by, for example, A. G. MacDiarmid, et al., in Journal of Chemical Society, Chemical Communication, page 1784 (1987).

The electrochemical oxidative polymerization is performed by anodic oxidation, and a constant current method, a constant voltage method or any other method may be used within the ranges of a current density of about 0.01 to 50 mA/cm$^2$, and an electrolytic voltage of 0.1 to 30 V. Polymerization is performed in an aqueous solution, or using organic solvent or a mixed solvent consisting of these. pH of the electrolyte is not limited particularly. However, preferably pH is not higher than 3, and more preferably not higher than 2. Specific examples of the acid used for adjusting pH include strong acids such as HCl, HBF$_4$, CF$_3$COOH, H$_2$SO$_4$, HNO$_3$, and p-toluenesulfonic acid, etc. However, the present invention is not limited thereto.

In the case of chemical oxidative polymerization, aniline or an aniline derivative, for example, is oxidatively polymerized in an acidic solution in the presence of an oxidizing agent such as peroxide, persulfate or the like. As the acid used in this case, there can be used the same acids as used in the case of electrochemical oxidative polymerization. However, the acid used for polymerization of the present invention is not limited thereto, either.

The molecular weight of the thus obtained aniline-based polymer used in the present invention is not limited particularly, but usually an aniline-based polymer having a molecular weight of at least 2,000 are preferred.

Also, the aniline-based polymer obtained in such a manner as above mostly contains the anions, as a dopant, which are present in the polymerization solution. This is disadvantageous in view of solubility and gravimetric capacity of the polymer. Therefore, it is preferred to undope the anions and further convert the aniline-based polymer into the reduced type before it is formed into an electrode, for example, by the film forming method. While there is no particular limitation in the method of undoping, usually a method is adopted in which the aniline-based polymer is treated with a base such as aqueous ammonia or sodium hydroxide. Also, there is no particular limitation in the manner of reduction. It is sufficient to perform common chemical or electrochemical reduction. For example, in the case of chemical reduction, reduction can be performed readily by dipping or stirring the aniline-based polymers treated with a base (i.e. the undoped aniline-based polymer) in a hydrazine or phenylhydrazine solution at room temperature.

The undoped or reduced type aniline-based polymers thus obtained are soluble in various organic solvents, and can be mixed in a state of solution with a polymerizable monomer solution comprising at least one of ACE or MCE represented by the general formula (I). The thus prepared mixture can be formed into a thin film, for example, by applying the mixture on a various support such as an electrode, or molded into any other form, whereby an electrode can be manufactured. Solvents in which these aniline-based polymers are dissolved may vary depending on the kind of the substituent groups on the benzene rings of the aniline-based polymers and are not limited particularly. Generally, pyrrolidones such as N-methylpyrrolidone, amides such as dimethylformamide, polar solvents such as m-cresol, or dimethyl propylene urea, etc. are good solvents.

According to the present invention, even a soluble electroconductive polymer like an aniline-based polymer soluble in an organic solvent can be formed into a flexible, thin-film electrode with the aid of (M)ACE polymer and therefore, above-mentioned electroconductive polymers to be used in the electrode or battery of the present invention may be soluble or insoluble in organic solvent.

Next, an example for the manufacturing process of an electrode and a battery of the present invention will be explained in detail.

For example, at least one compound selected from ACE or MCE represented by the general formula (I) are mixed with an electroactive substance (positive electrode material or negative electrode material) mentioned above, with or without an optionally-added other polymerizable compounds and/or with or without an optionally-added plasticizer. In this case, compounds to be comprised are mixed in an appropriate proportion depending on the battery to be manufactured. The thus obtained mixture of polymerizable monomers/electroactive substances is made in a form such as film and then polymerized to obtain an electrode. In this process, polymerization can be performed similarly as in the above-mentioned polymerization process for obtaining the (M)ACE polymer from ACE or MCE, for example, using heat and/or electromagnetic radiation. When the electroactive substance gives a flowable mixture of polymerizable monomer/electroactive material like, for example, an aniline-based polymer soluble in an organic solvent, the mixture is molded in a desired form, for example, applied on a support such as collector or other support made of glass or the like to form a film followed by polymerization to manufacture an electrode.

The thus manufactured electrode comprising above-mentioned electroactive substance is used as at least one of the electrodes and another electrode which has been similarly manufactured and comprises other electroactive material or a conventionally used electrode is used as the other one of the electrodes, and these two electrodes are put in a frame for construction of a battery or they are located on the support in such a configuration as they do not contact with each other. For example, negative electrode and positive electrode are attached at the edges thereof through a spacer of an appropriate thickness, placed in the above-mentioned frame, and then, after a polymerizable monomer mixture prepared by mixing at least one compound selected from ACE and MCE represented by the general formula (I) with at least one electrolyte selected from the above-mentioned electrolytes such as alkali metal salts, with or without optionally-added other polymerizable compounds and/or with or without an optionally-added plasticizer is poured in between the negative and positive electrodes, the mixture is polymerized in the same manner as in the polymerization process for obtaining the above-mentioned (M)ACE polymer, for example, with heat and/or electromagnetic radiation and optionally further sealed with an insulating resin such as epoxy resins and the like, whereby batteries are obtained in which a good contact between the electrode and the electrolyte is achieved. When the electrode obtained by polymerizing a mixture of the above-mentioned polymerizable monomers is used, batteries are obtained in which an especially good contact between the electrode and the electrolyte is achieved. In preparing such a polymerizable monomer mixture, proportion of each components are appropriately decided depending on the battery to be manufactured. The above-mentioned battery frame or support may be made of metals such as stainless steels, resins such as polypropylene, polyimide, etc., or ceramic materials such electroconductive or insulating glass and the like, although the material thereof are not particularly limited to those listed here. They may be shaped in a cylinder, a coin, a box, a sheet or any other form.

As described above, in fabricating a thin film battery a manufacturing process in which a polymerizable monomer comprising at least one electrolyte and at least one of ACE and MCE represented by the general formula (I) is polymerized to give a solid polymer electrolyte comprising (M)ACE polymer is particularly useful.

Figure 2:
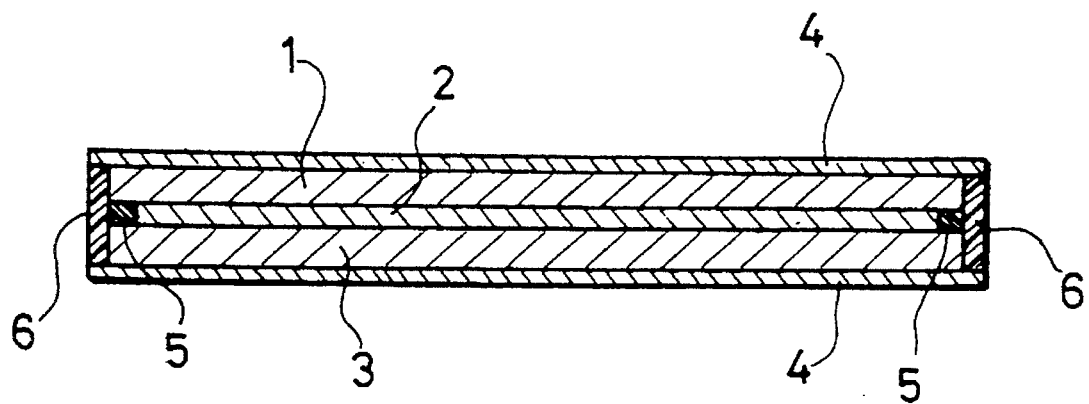
FIG. 2 is a schematic cross-sectional view showing an example of a thin solid-state battery according to the present invention. In the figure, 1 is positive electrode, 2 is solid polymer electrode, 3 is negative electrode, 4 is collector, 5 is spacer and 6 is insulating resin sealing.

As an example of the thus manufactured batteries of the present invention, FIG. 2 shows a schematic cross-sectional view of a thin solid-state battery. In FIG. 2, 1 is a positive electrode, 2 is a solid polymer electrolyte, 3 is a negative electrode, 4 is a collector, 5 is an insulating polyimide film which is a spacer, and 6 is an insulating resin sealing.

In the case where a cylindrical battery is fabricated, it is possible to use a method in which the above-described positive electrode and negative electrode are bonded to each other through a solid polymer electrolyte sheet prepared in advance, the resulting laminate is wound and then inserted in a battery frame, in which the polymerizable monomer mixture as described above is poured, followed by polymerization.

Next, solid-state electric double layer capacitor of the present invention is explained below.

A whole solid-state electric double layer capacitor achieving high voltage output and large take-out current, and excellent in processability and reliability can be obtained by using above-mentioned solid polymer electrolyte of the present invention in the solid-state electric double layer capacitor.

Figure 3:
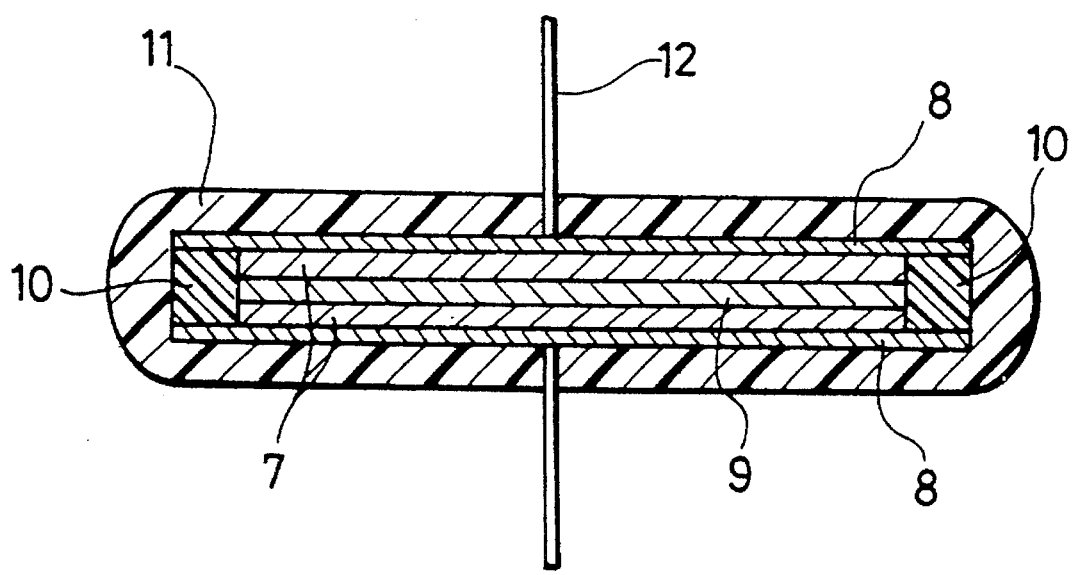
FIG. 3 is a schematic cross-sectional view showing an example of a solid-state electric double layer capacitor according to the present invention, wherein a pair of polarizable electrodes 7 is arranged inside the collector 8 between which solid polymer electrolyte film 9 is arranged. 10 is spacer comprising an insulating film, 11 is insulating resin sealing and 12 is lead wire.

FIG. 3 is a schematic cross-sectional view showing an example of a solid-state electric double layer capacitor of the present invention. The solid-state electric double layer capacitor comprises a thin film cell having an area of 1 cm×1 cm and a thickness of about 0.5 mm. In FIG. 3, 8 is a collector, inside of which is arranged a pair of polarizable electrodes 7 and a solid polymer electrolyte film 9 is arranged between these electrodes. 10 is a spacer comprising an insulating film used in this embodiment, 11 is an insulating resin sealing and 12 is a lead wire.

The collector 8 is preferably made of a material which is electron-conducting and electrochemically anticorrosive, and has a specific surface area as large as possible. For example, there can be cited various metals and their sintered body, electron-conducting polymers, carbon sheets, etc.

Although the polarizable electrode 7 may comprise any polarizable material conventionally used in a solid-state electric double layer capacitor such as carbon materials, an electrode comprising a material obtained by compounding such a carbon material with the solid polymer electrolyte of the present invention is preferred. The carbon material as polarizable material is not limited particularly so far as it has a sufficient specific surface area. The larger the specific surface area, the larger the capacity of the electric double layer. So, it is preferred to use as large as possible a specific surface area. For example, there can be used carbon blacks such as furnace black, thermal black (inclusive of acetylene black), channel black, etc., activated carbon such as coconut shell activated carbon, natural graphite, synthesized graphite, graphite prepared by a vapor phase method, polyacene, fullerenes such as $C_{60}$ and $C_{70}$, etc.

Next, an example for fabricating the solid-state electric double layer capacitor of the present invention is explained below.

As described above, a manufacturing process in which a mixture of polymerizable monomer mixture obtained by mixing at least one electrolyte and at least one of the above-mentioned ACE or MCE represented by the general formula (I) is polymerized and made into a compounded body comprising (M)ACE polymer and at least one electrolyte is particularly useful in manufacturing a solid-state electric double layer capacitor of the present invention.

In manufacturing a polarizable electrode comprising a polarizable material such as carbon materials and the above-mentioned (M)ACE polymer which is preferably used in a solid-state electric double layer capacitor of the present invention, first, at least one compound selected from ACE or MCE represented by the general formula (I), with or without optionally-added other polymerizable compounds and/or with or without an optionally-added plasticizer are mixed with a polarizable material. Each components are mixed in appropriate proportions which are decided depending on the capacitor to be manufactured. The thus obtained mixture of polymerizable monomers/polarizable materials are formed in a film on a support, for example, on the collector, and then polymerized similarly as in the above-mentioned polymerization process for obtaining the (M)ACE polymer from ACE and MCE, for example, with heat or electromagnetic radiation, whereby a polarizable electrode is manufactured. According to the present invention, compounded thin-film electrodes can be manufactured which have a good contact with the collector.

Two of the thus manufactured polarizable electrodes are placed in a frame for construction of a capacitor or they are located on the support in such a configuration as they do not contact with each other. For example, the two electrodes are bonded at the edges thereof through a spacer of an appropriate thickness, placed in the above-mentioned frame, and then, after a polymerizable monomer mixture prepared by mixing at least one compound selected from ACE and MCE represented by the general formula (I) and at least one electrolyte selected from the above-mentioned electrolytes such as alkali metal salts, with or without optionally-added other polymerizable compounds and/or with or without an optionally-added plasticizer is poured in between the two electrodes, the mixture is polymerized in the same manner as mentioned above and optionally further sealed with an insulating resin such as epoxy resins and the like, whereby electric double layer capacitors are obtained in which a good contact between the electrode and the electrolyte is achieved. In preparing such a monomer mixture, each components are mixed in appropriate proportions which are decided depending on the capacitor to be manufactured. The above-mentioned capacitor frame or support may be made of any material like metals such as stainless steels, resins such as polypropylene, polyimide, etc., or ceramic materials such electroconductive or insulating glass and the like, although the material thereof are not particularly limited to those listed here. They may be shaped in a cylinder, a coin, a box, a sheet or any other form.

The shape of the solid-state electric double layer capacitor may be, in addition to the sheet type as shown in FIG. 3, a coin type, or a cylinder type which can be fabricated by winding a laminate of a sheet-like polarizable electrode and a sheet-like solid polymer electrolyte in the form of a cylinder, inserting the cylinder in a cylindrical capacitor frame and sealed.

When a cylindrical capacitor is to be fabricated, it is also possible to use a process in which the above-described polarizable electrodes are bonded through the solid polymer electrolyte sheet prepared in advance, the laminate is wound and inserted in a capacitor frame, and then the above-mentioned polymerizable monomer mixture is poured in, which mixture is then polymerized.

ADVANTAGEOUS EFFECTS

The solid polymer electrolyte of the present invention is a solid polymer electrolyte comprising a comb-shaped or network-shaped polymer having incorporated into its side chain an oxyalkyl group containing urethane bonding, which polymer, as described above, can be readily made and compounded into a film from a polymerizable monomer mixture as a raw material and which has a high ionic conductivity, a good film strength and an excellent thin film processability.

The battery of the present invention comprising the above-mentioned solid polymer electrolyte as ionic conducting substance can be easily produced in the form such as a thin film-type, and it is free from short-circuit even when made in the form of a thin film-type. It produces a large take out current and provides a highly reliable battery, especially a whole solid type one.

Also, the battery of the present invention having negative electrode which comprises an electroactive material of lithium, lithium alloy, a carbon material which can occlude and discharge lithium ion or the like can be easily produced in the form of a thin film-type by using the above-mentioned solid polymer electrolyte as ionic conducting substance, and it is free from short-circuit even when made in the form of a thin film-type. It produces a large take out current and provides a highly reliable battery, especially a whole solid type one.

Furthermore, the battery of the present invention having positive electrode which comprises the above-mentioned (M)ACE polymer and an aniline-based polymer soluble in organic solvent or other electroconductive polymer, metal oxide, metal sulfide, a carbon material or the like and is characterized by using the above-mentioned solid polymer electrolyte as ionic conducting substance can be easily produced in the form such as a thin film-type, and it is free from short-circuit even when made in the form of a thin film-type. It produces a large take out current and provides a highly reliable battery, especially a whole solid type one.

Still further, the electrode of the present invention which comprises the above-mentioned (M)ACE polymer and an electroactive substance such as an aniline-based polymer soluble in organic solvent or other electroconductive polymer, metal oxide, metal sulfide, a carbon material or the like and the manufacturing process of said electrode provide an electrode having desired flexibility without deteriorating excellent electrochemical activity which the said electroactive substance has, and specifically provide, for example, thin film-like electrode useful in various batteries.

In addition, according to the manufacturing process of the battery the present invention, batteries in various shapes can be manufactured, especially it facilitates batteries to be made thinner and provides highly reliable batteries which can operate at high capacity and at high voltage and has good cyclability.

The electric double layer capacitor of the present invention is the one which comprises as an ionic conducting substance a solid polymer electrolyte that can be prepared by dissolving an electrolyte in an above-described polymerizable monomer mixture which gives a comb-shaped or network-shaped polymer having an oxyalkyl group containing urethane bonding and can be readily molded and compounded into a film of a good film-strength, and then polymerizing the mixture. It is free from short-circuit even when made in the form of a thin film-type, provides a highly reliable electric double layer capacitor having a high output voltage and a large take out current, especially a solid-state electric double layer capacitor.

In particular, the electric double layer capacitor and the process for manufacturing the same according to the present invention provide a highly reliable electric double layer capacitor achieving a good contact between the polarizable electrode and the solid polymer electrolyte which functions as an ionic conducting substance, a high voltage output and a large take out current, and especially provide whole solid-state electric double layer capacitor.

BEST MODE FOR CARRYING OUT THE INVENTION

Hereinafter, the present invention will be described more concretely by representative examples. Needless to say, these examples are mere examples for the purpose of explanation and the present invention is not limited to these examples by any means.

EXAMPLE 1

(1) Synthesis of 2-acryloyloxyethylcarbamic acid ω-methyloligooxyethyl ester (ACOA (350))

0.1 mol (14.1 g) of 2-acryloyloxyethylisocyanate (AOI) and 0.1 mol (35 g) of monomethyloligoethylene glycol having an average molecular weight of 350 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACOA (350) as a colorless viscous liquid. $^1$H-NMR, IR and elemental analyses were made. The results revealed that AOI and monomethyloligoethylene glycol reacted in a molar proportion of 1:1, and that the isocyanate group in AOI disappeared and a urethane bonding was formed.

(2) Production and evaluation of ACOA (350)-based solid polymer electrolyte 1.46 g of ACOA (350) was dissolved in 10 ml of THF and 0.14 g of LiCF$_3$SO$_3$ was added thereto and mixed well. Then, THF was removed at room temperature under reduced pressure. Thus, an ACOA (350)/LiCF$_3$SO$_3$ mixture was obtained as a viscous liquid. Under argon atmosphere, the mixture was applied on a glass plate, and heated at 100° C.

for 1 hour to produce an ACOA (350) polymer/LiCF$_3$SO$_3$ composite as a transparent film of about 200 μm thickness. The ionic conductivity of the film measured at 25° C. by an impedance method was 2×10$^{-4}$ S/cm.

EXAMPLE 2

(1) Synthesis of 2-acryloyloxyethylcarbamic acid 2-acryloyloxyethylcarbamoyloligooxyethyl ester (ACAC (400))

0.2 mol (28.2 g) of 2-acryloyloxyethylisocyanate (AOI) and 0.1 mol (40 g) of oligoethylene glycol having an average molecular weight of 400 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACAC (400) as a colorless viscous liquid. $^1$H-NMR, IR and elemental analyses were made. The results indicated that AOI and oligoethylene glycol reacted in a molar proportion of 2:1, and that the isocyanate group in AOI disappeared and urethane bonding was formed.

(2) Production and evaluation of ACOA (350)/ACAC (400) copolymer-based solid polymer electrolyte 1.46 g of ACOA (350) synthesized in Example 1 and 0.40 g of ACAC (400) synthesized in Example 2(1) were dissolved in 20 ml of THF, and 0.14 g of LiCF$_3$SO$_3$ was added thereto and mixed well. Then, THF was removed at room temperature under reduced pressure. Thus, an ACOA (350)/ACAC (400)/LiCF$_5$O$_3$ mixture was obtained as a viscous liquid. Under argon atmosphere, the mixture was applied on a glass plate, and heated at 100° C. for 1 hour to produce an ACOA (350)/ACAC (400) copolymer/LiCF$_3$SO$_3$ composite as a transparent, free-standing film of about 100 μm thickness. The ionic conductivity of the film measured at 25° C. by an impedance method was 2×10$^{-5}$ S/cm.

EXAMPLE 3

A solid polymer electrolyte was produced and fabricated in the same manner as in Example 1, except for using 0.15 g of NaCF$_3$SO$_3$ instead of LiCF$_3$SO$_3$ used in Example 1. The ionic conductivity of the thus fabricated film measured at 25° C. by an impedance method was 2×10$^{-4}$ S/cm.

EXAMPLE 4

A solid polymer electrolyte was produced and fabricated in the same manner as in Example 1, except for using 0.11 g of LiI instead of LiCF$_3$SO$_3$ used in Example 1. The ionic conductivity of the thus fabricated film measured at 25° C. by an impedance method was 3×10$^{-4}$ S/cm.

EXAMPLE 5

(1) Synthesis of 2-methacryloyloxyethylcarbamic acid methyloligooxyethyl ester (MCOA (550))

0.1 mol (15.5 g) of 2-methacryloyloxyethylisocyanate (MOI) and 0.1 mol (55 g) of monomethyloligoethylene glycol having an average molecular weight of 550 were dissolved in 100 ml of sufficiently purified THF under a nitrogen atmosphere, and thereafter, 0.66 g of dibutyltin dilaurate was added thereto. Reaction was run at 50° C. for about 3 hours to obtain MCOA (550) as a colorless viscous liquid. $^1$H-NMR, IR and elemental analyses were made. The results indicated that MOI and monomethyloligoethylene glycol reacted in a molar proportion of 1:1, and that the isocyanate group in MOI disappeared and urethane bonding was formed.

(2) Production and evaluation of MCOA (550)-based solid polymer electrolyte 2.09 g of MCOA (550) was dissolved in 10 ml of THF and 0.14 g of LiCF$_3$SO$_3$ was added thereto and mixed well. Then, THF was removed at room temperature under reduced pressure. Thus, an MCOA (550)/LiCF$_3$SO$_3$ mixture was obtained as a viscous liquid. Under argon atmosphere, the mixture was applied on a glass plate, and heated at 100° C. for 1 hour to produce an MCOA (550) polymer/LiCF$_3$SO$_3$ composite as a transparent, free-standing film of about 200 μm thickness. The ionic conductivity of the film measured at 25° C. by an impedance method was 3×10$^{-5}$ S/cm.

EXAMPLE 6

(1) Synthesis of 2-acryloyloxyethylcarbamic acid 2-acryloyloxyethylcarbamoyloligooxyethyl ester (ACAC (600))

0.2 mol (28.2 g) of 2-acryloyloxyethylisocyanate (AOI) and 0.1 mol (60 g) of oligoethylene glycol having an average molecular weight of 600 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACAC (600) as a colorless gel-like solid. $^1$H-NMR, IR and elemental analyses were made. The results indicated that AOI and oligoethylene glycol reacted in a molar proportion of 2:1, and that the isocyanate group in AOI disappeared and urethane bonding was formed.

(2) Production and evaluation of MCOA (550)/ACAC (600) copolymer-based solid polymer electrolyte 2.10 g of MCOA (550) and 0.51 g of ACAC (600) were dissolved in 20 ml of THF and 0.14 g of LiCF$_3$SO$_3$ was added thereto and mixed well. Then, THF was removed at room temperature under reduced pressure. Thus, an MCOA (550)/ACAC (600)/LiCF$_3$SO$_3$ mixture was obtained as a viscous liquid. Under argon atmosphere, the mixture was applied on a glass plate, and heated at 100° C. for 1 hour to produce an MCOA (550)/ACAC (600) copolymer/LiCF$_3$SO$_3$ composite as a transparent, free-standing film of about 100 μm thickness. The ionic conductivity of the film measured at 25° C. by an impedance method was 1×10$^{-5}$ S/cm.

EXAMPLE 7

(1) Synthesis of 2-acryloyloxyethylcarbamic acid methyloligooxyethyl ester (ACOA (164))

0.1 mol (14.1 g) of AOI and 0.1 mol (16 g) of monomethyltriethylene glycol having an average molecular weight of 164 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACOA (164) as a pale yellow viscous liquid. $^1$H-NMR, IR and elemental analyses were made. The results indicated that AOI and monomethyloligoethylene glycol reacted in a molar proportion of 1:1, and that the isocyanate group in AOI disappeared and urethane bonding was formed.

(2) Production and evaluation of ACOA (164)/ACAC (400) copolymer-based solid polymer electrolyte 0.95 g of ACOA (164) and 0.40 g (ACAC) synthesized in Example 2(1) were dissolved in 20 ml of THF and 0.14 g of $LiCF_3SO_3$ was added thereto and mixed well. Then, THF was removed at room temperature under reduced pressure. Thus, an ACOA (164)/ACAC (400)/$LiCF_3SO_3$ mixture was obtained as a viscous liquid. Under argon atmosphere, the mixture was applied on a glass plate, and heated at 100° C. for 1 hour to produce an ACOA (164)/ACAC (400) copolymer/$LiCF_3SO_3$ composite as a transparent, free-standing film of about 100 μm thickness. The ionic conductivity of the film measured at 25° C. by an impedance method was $8 \times 10^{-6}$ S/cm.

EXAMPLE 8

A solid polymer electrolyte was produced and fabricated in the same manner as in Example 5, except for using 0.13 g of $NaCF_3SO_3$ instead of $LiCF_3SO_3$ used in Example 7. The ionic conductivity of the thus fabricated film measured at 25° C. by an impedance method was $9 \times 10^{-6}$ S/cm.

EXAMPLE 9

A solid electrolyte was produced and fabricated in the same manner as in Example 7, except for using 0.30 g of AgI instead of $LiCF_3SO_3$ used in Example 7. The ionic conductivity of the thus fabricated film measured at 25° C. by an impedance method was $8 \times 10^{-5}$ S/cm.

EXAMPLE 10

(1) Synthesis of 2-acryloyloxyethylcarbamic acid ω-methyloligooxypropyl ester (ACOA (440))

0.1 mol (14.1 g) of AOI and 0.1 mol (44 g) of monomethyloligopropylene glycol having an average molecular weight of 440 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACOA (440) as a pale yellow viscous liquid. $^1$H-NMR, IR and elemental analyses were made. The results revealed that AOI and monomethyloligopropylene glycol reacted in a molar proportion of 1:1, and that the isocyanate group in AOI disappeared and urethane bonding was formed.

(2) Production and evaluation of ACOA (440)/ACAC (400) copolymer-based solid polymer electrolyte 1.84 g of ACOA (440) and 0.40 g of ACAC (400) prepared in Example 2 were dissolved in 20 ml of THF and 0.14 g of $LiCF_3SO_3$ was added thereto and mixed well. Then, THF was removed at room temperature under reduced pressure. Thus, an ACOA (440)/ACAC (400)/$LiCF_3SO_3$ mixture was obtained as a viscous liquid. Under argon atmosphere, the mixture was applied on a glass plate, and heated at 100° C. for 1 hour to produce an ACOA (440)/ACAC (400) copolymer/$LiCF_3SO_3$ composite as a transparent, free-standing film of about 100 μm thickness. The ionic conductivity of the film measured at 25° C. by an impedance method was $3 \times 10^{-5}$ S/cm.

EXAMPLE 11

A solid polymer electrolyte as a transparent, free-standing film was produced and fabricated in the same manner as in Example 10, except for using 0.30 g of tetrabutylammonium tetrafluoroborate (TBAB) instead of $LiCF_3SO_3$ used in Example 10. The ionic conductivity of the thus fabricated film measured at 25° C. by an impedance method was $9 \times 10^{-6}$ S/cm.

EXAMPLE 12

0.48 g of ACOA (164) prepared in Example 7, 2.05 g of MCOA (550) prepared in Example 5 and 0.40 g of ACAC (400) prepared in Example 2 were dissolved in 10 ml of THF and 0.17 g of $LiCF_3SO_3$ was added thereto and mixed well. Then, THF was removed at room temperature under reduced pressure. Thus, an ACOA (164)/MCOA (550)/ACAC (400)/$LiCF_3SO_3$ mixture was obtained as a highly viscous semisolid. Under argon atmosphere, the mixture was applied on a glass plate, and heated at 100° C. for 1 hour to produce an ACOA (164)/MCOA (550)/ACAC (400) copolymer/$LiCF_3SO_3$ composite as a transparent, free-standing film of about 150 μm thickness. The ionic conductivity of the film measured at 25° C. by an impedance method was $1 \times 10^{-5}$ S/cm.

EXAMPLE 13

Temperature dependence of the ionic conductivity of the solid polymer electrolyte film fabricated in Example 1 was measured by an impedance method. FIG. 1 illustrates the results obtained. In FIG. 1, the ordinate indicates ionic conductivity on a logarithmic scale while the abscissa indicates temperature in terms of 1,000/absolute temperature, and thus the data are shown in an Arrhenius plot with the slope representing the activation energy for the migration of an ion in the ACOA (350) polymer/$LiCF_3SO_3$-based solid polymer electrolyte.

EXAMPLE 14

1.46 g of ACOA (350) prepared in Example 1, 0.40 g of ACAC (400) prepared in Example 2, 1.5 g of propylene carbonate (PC), and 0.28 g of $LiCF_3SO_3$ were mixed well under an argon atmosphere to obtain an ACOA (350)/ACAC (400)/PC/$LiCF_3SO_3$ mixture as a viscous liquid. Under argon atmosphere, the mixture was applied on a glass plate, and heated at 100° C. for 1 hour to produce an ACOA (350)/ACAC (400) copolymer/PC/$LiCF_3SO_3$ composite as a transparent, free-standing film of about 300 μm thickness. The ionic conductivity of the film measured at 25° C. by an impedance method was $2 \times 10^{-3}$ S/cm.

EXAMPLE 15

An ACOA (350)/ACAC (400) copolymer/TG/$LiCF_3SO_3$ composite as a transparent, free-standing film of about 350 μm thickness was fabricated in the same manner as in Example 14, except for using tetraglyme (TG) instead of propylene carbonate used in Example 14. The ionic conductivity of the film measured at 25° C. by an impedance method was $7 \times 10^{-4}$ S/cm.

EXAMPLE 16

An ACOA (350)/ACAC (400) copolymer/DEC/$LiCF_3SO_3$ composite as a transparent, free-standing film of about 250 μm thickness was fabricated in the same manner as in Example 14, except for using diethyl carbonate (DEC) instead of propylene carbonate used in Example 14. The ionic conductivity of the film measured at 25° C. by an impedance method was $3\times10^{-3}$ S/cm.

EXAMPLE 17

0.1 mol (16.8 g) of hexamethylenediisocyanate, 0.1 mol (40 g) of polyethylene glycol having an average molecular weight of 400 and 0.1 mol (16.4 g) of triethylene glyocol monomethylether were dissolved in 100 ml of THF sufficiently purified under nitrogen atmosphere and 0.66 g of dibutyltin dilaurate was added thereto. After the mixture was reacted at 60° C. for about 1 hour, colorless viscous liquid product was obtained. $^1$H-NMR, IR and elemental analyses showed that the isocyanate group in hexamethylenediisocyanate disappeared and the urethane bonding was made. The product was also tested by gel permeation chromatography (GPC), which indicated that the average molecular weight of the obtained product was about 750 as calculated using polyethylene glycol sa a molecular-weight standard material. 75 g of this compound prepared in the same manner as above and 0.1 mol (15.5 g) of MOI were dissolved in 100 ml of sufficiently purified THF under nitrogen atmosphere and 0.66 g of dibutyltin dilaurate was added thereto. After the mixture was reacted at 50° C. for about 3 hours, colorless viscous liquid product was obtained. $^1$H-NMR, IR and elemental analyses showed that the isocyanate group in MOI disappeared and the number of the urethane bonding was increased.

2.69 g of this monomer was dissolved in 10 ml of THF and 0.14 g of $LiCF_3SO_3$ was added thereto to prepare a polymerizable monomer mixture. Then, under argon atmosphere, the mixture was applied on a glass plate, and heated at 100° C. for 1 hour for effecting polymerization and a solid polymer electrolyte was produced as a transparent, free-standing film of about 100 μm thickness. The ionic conductivity of the film measured at 25° C. by an impedance method was $1\times10^{-5}$ S/cm.

EXAMPLE 18

0.1 mol (16.8 g) of hexamethylenediisocyanate, 0.2 mol (80 g) of polyethylene glycol having an average molecular weight of 400 were dissolved in 100 ml of sufficiently purified THF under nitrogen atmosphere and 0.66 g of dibutyltin dilaurate was added thereto. After the mixture was reacted at 60° C. for about one hour, white solid product was obtained. $^1$H-NMR, IR and elemental analyses showed that the isocyanate group in hexamethylenediisocyanate disappeared and the urethane bonding was formed. The GPC measurement of this product showed that the average molecular weight of the obtained product was about 1,000 as calculated using polyethylene glycol as a molecular-weight standard material. 50 g of this compound and 0.1 mol (14.1 g) of AOI were dissolved in 100 ml of sufficiently purified THF under nitrogen atmosphere and 0.66 g of dibutyltin dilaurate was added thereto. After the mixture was reacted at 50° C. for about 3 hours, white solid product was obtained. $^1$H-NMR, IR and elemental analyses showed that the isocyanate group in AOI disappeared and the number of the urethane bonding was increased.

EXAMPLE 19

2.69 g of the monomer obtained in Example 17, 0.74 g of the monomer obtained in Example 18, 1.8 g of propylene carbonate (PC), 1.8 g of ethylene carbonate (EC) and 0.28 g of $LiCF_3SO_3$ were mixed well under argon atmosphere to produce a polymerizable monomer mixture as a viscous liquid. Under argon atmosphere, the mixture was applied on a glass plate, and heated at 100° C. for 1 hour for effecting polymerization and a plastic solid polymer electrolyte was obtained as a transparent, free-standing film of about 300 μm thickness. The ionic conductivity of the film measured at 25° C. by an impedance method was $1\times10^{-3}$ S/cm.

EXAMPLE 20

Production of a polymerizable monomer mixture 2.10 g of MCOA (550) prepared in Example 5, 0.51 g of ACAC (600) prepared in Example 6, 1.3 g of propylene carbonate (PC), 1.3 g of ethylene carbonate (EC) and 0.56 g of $LiBF_4$ were mixed well under an argon atmosphere to produce a polymerizable monomer mixture consisting of a MCOA (550)/ACAC (600)/PC/EC/$LiBF_4$ mixture as a viscous liquid.

Under argon atmosphere, the mixture was applied on a glass plate, and heated at 100° C. for 1 hour to produce an MCOA (550)/ACAC (600) copolymer/PC/EC/LiBF4 composite as a transparent, free-standing film of about 300 μm thickness. The ionic conductivities of the film measured at 25° C. and –10° C. by an impedance method were $3\times10^{-3}$ S/cm and $1\times10^{-3}$ S/cm, respectively,

EXAMPLE 21

Production of a positive electrode comprising cobalt oxide and solid polymer electrolyte 22 g of $Li_2CO_3$ and 24 g of $Co_3O_4$ were mixed well and heated at 800° C. for 24 hours under an oxygen atmosphere, followed by pulverizing to obtain $Li_2CoO_2$ powder. The $Li_2CoO_2$ powder and the polymerizable monomer mixture produced in Example 20 were mixed in a proportion by weight of 7:3 under an argon atmosphere, and the mixture was applied on a stainless steel foil in an area of 1 cm×1 cm and to a thickness of about 200 μm. Further, the coated foil was heated at about 100° C. for 1 hour for polymerization to produce a cobalt oxide/solid polymer electrolyte composite positive electrode (65 mg).

EXAMPLE 22

Fabrication of secondary battery comprising solid polymer electrolyte

In a glove box under an argon atmosphere, a lithium foil of 75 μm thickness was cut to a piece of 1 cm×1 cm (5.3 mg). At each edge portion (1 mm width) of the foil was covered with a polyimide film of 10 μm thickness as a spacer. Next, 15 mg of the polymerizable monomer mixture produced in Example 20 was applied on the lithium foil, and then, the cobalt oxide positive electrode produced in example 21 was tightly fitted onto the mixture-coated surface of the lithium foil. The resulting structure was heated at 100° C. for 1 hour, and the edge portions of the battery were sealed with an epoxy resin to produce a solid-state lithium/cobalt oxide secondary battery having a structure same as shown in FIG. 2.

This battery was subjected to repeated charging and discharging at an operating voltage of 2.0 to 4.3 V and at a constant current of 0.1 mA. As a result, it revealed that the maximum discharge capacity was 4.0 mAh, and a cycle life until the capacity decreased to 50% was 200 times.

EXAMPLE 23

Production of a positive electrode comprising polyaniline and solid polymer electrolyte Electrolytic oxidative electrochemical polymerization was performed on a 1 cm×1 cm stainless steel foil using a graphite foil as the counter electrode and a 0.5M aqueous aniline solution and a 1.5M aqueous HBF$_4$ solution by a constant current method at a current of 1 mA to obtain a film of about 100 μm thickness. Then, the film was washed with methanol and dried at 80° C. for 24 hours under vacuum.

Then, the thus obtained film (15 mg in weight) was transferred into a glove box under an argon atmosphere, and impregnated with the polymerizable monomer mixture produced in Example 20. Then, polymerization was performed at 100° C. for 1 hour to produce a positive electrode comprising polyaniline/solid polymer electrolyte (45 mg).

EXAMPLE 24

Fabrication of secondary battery comprising lithium, polyaniline and solid polymer electrolyte A lithium/polyaniline solid secondary battery was produced in the same manner as in Example 22 except that the positive electrode comprising polyaniline and solid polymer electrolyte produced in Example 23 was used instead of that comprising cobalt oxide.

This battery was subjected to repeated charging and discharging at an operating voltage of 2.0 to 4.0 V and at a constant current of 0.1 mA. As a result, it revealed that the maximum discharge capacity was 1.0 mAh, and a cycle life until the capacity decreased to 50% was 500 times.

EXAMPLE 25

Production of a negative electrode comprising graphite produced by a vapor phase method and solid polymer electrolyte 10 g of graphite fiber produced by a vapor phase method by Showa Denko K.K. (average fiber diameter: 0.3 μm, average fiber length: 2.0 μm, heat treated at 2,700° C.) was mixed with 200 ml of 2.5M butyllithium solution in n-hexane and stirred for 8 hours at room temperature to incorporate lithium ion in advance, followed by washing with hexane and drying in vacuo. 6 g of the graphite fiber thus prepared which incorporated lithium at an atomic ratio of C/Li=12/1 (determined by elemental analysis) and 4 g of the polymerizable monomer mixture prepared in Example 20 were mixed under an argon atmosphere and an aliquot of the mixture was applied on a stainless steel foil to an area of 1 cm×1 cm and a thickness of about 150 μm. The coated foil was heated at about 100° C. for 1 hour for polymerization to produce a negative electrode comprising a vapor phase graphite and solid polymer electrolyte (21 mg).

EXAMPLE 26

Fabrication of a secondary battery comprising graphite fiber, cobalt oxide and solid polymer electrolyte electrode A vapor phase graphite fiber/cobalt oxide solid secondary battery was produced in the same manner as in Example 22 except that the negative electrode comprising vapor phase graphite fiber and solid polymer electrolyte produced in Example 25 was used instead of the lithium foil. This battery was subjected to repeated charging and discharging at an operating voltage of 1.5 to 4.3 V and at a constant current of 0.1 mA. As a result, it revealed that the maximum discharge capacity was 3.8 mAh, and a cycle life until the capacity decreased to 50% was 300 times.

EXAMPLE 27

Synthesis of organic solvent-soluble polyaniline

In a 1 liter four-necked flask equipped with a thermometer, a stirrer and a capacitor was placed 500 ml of 1N aqueous HCl solution and 20.3 g of aniline was dissolved therein while bubbling nitrogen. Then, 11.5 g of solid ammonium persulfate was added over about 30 minutes while stirring and bubbling nitrogen. Reaction temperature was kept at about 22° C. After the addition, the reaction was further continued for additional 22 hours. Then, the reaction mixture was filtered, and the residue was washed with 500 ml of deionized water. Then, the product was transferred into a beaker, and 500 ml of a 5% ammonia water was added and the mixture was stirred for about 1 hour, followed by filtration. The residue was washed with deionized water and dried under reduced pressure to obtain about 16 g of undoped polyaniline powder.

Next, in a 300 ml three-necked flask was placed 150 ml of hydrazine monohydrate, and the above-described undoped polyaniline powder was added little by little at room temperature for about 1 hour while stirring and flowing nitrogen. Further, under flow of nitrogen, the mixture was stirred for about 10 hours at room temperature. Then, the reaction mixture was filtered under a nitrogen atmosphere and the residue was dried under reduced pressure. Further, under nitrogen atmosphere, the residue was washed with purified THF and with purified ether, followed by drying under reduced pressure to obtain about 14 g of reduced polyaniline powder.

Elemental analysis value of the reduced polyaniline powder was as follows: total of carbon, hydrogen and nitrogen was 98%, and elemental ratio of carbon/hydrogen/nitrogen was 6.00/4.95/1.01, which substantially coincided with the calculated value.

The powder dissolved in purified N-methylpyrrolidone (NMP) to a concentration of up to about 5 wt % under nitrogen atmosphere. The number-average molecular weight of the polyaniline obtained from the GPC measurement of the solution was about 20,000 as calculated using polystyrene as a molecular-weight standard material.

EXAMPLE 28

Production of a positive electrode comprising polyaniline and solid polymer electrolyte In a glove box under an argon atmosphere, the polymerizable monomer mixture prepared in Example 20 was mixed with the 5 wt % polyaniline/NMP mixture prepared in Example 27 so that the proportion by weight of the polyaniline and the polymerizable monomer mixture was 1:1. The resulting mixture was applied on a stainless steel foil of a size of 15×15 mm and of a thickness of 100 μm in an area surrounded by a polyimide film of 50 μm thickness affixed to each edge portion of the foil in a width of 3 mm.

Then, the foil coated with the mixture was heated at 60° C., 80° C. and 100° C. each for 1 hour to dry the coating and polymerize the monomers to produce a positive electrode comprising polyaniline and solid polymer electrolyte (68 mg).

EXAMPLE 29

Fabrication of secondary battery comprising lithium, polyaniline and solid polymer electrolyte In a glove box under an argon atmosphere, a lithium foil of 25 μm thick was cut to a piece of 12×12 mm (2.6 mg). At each edge portion (2 mm width) of the foil was covered with a polyimide film of 10 μm thickness as a spacer. Next, the polymerizable monomer mixture prepared in Example 20 was applied on the lithium foil, and then the polyaniline positive electrode produced in Example 28 was tightly fitted onto the coated surface of the lithium foil. The resulting structure was heated at 100° C. for 1 hour, and the edge portions of the battery were sealed with an epoxy resin to produce a solid-state lithium/polyaniline secondary battery having a structure same as shown in FIG. 2.

This battery was subjected to repeated charging and discharging at an operating voltage of 2 to 4 V and at a constant current density of 0.1 mA. As a result, it revealed that the maximum discharge capacity was 1.5 mAh, and a cycle life until the capacity decreased to 50% was 200 times.

EXAMPLE 30

Production of a positive electrode comprising poly-o-anisidine and solid polymer electrolyte 18 g of reduced poly-o-anisidine powder was synthesized and treated in the same manner as in Example 27 except that 27.0 g of o-anisidine was used instead of the aniline used in Example 27.

Elemental analysis value of the reduced poly-o-anisidine powder was: total of carbon, hydrogen and nitrogen was 98%, and elemental ratio of carbon/hydrogen/nitrogen was 7.00/6.91/1.03, which substantially coincided with the calculated value.

The reduced poly-o-anisidine powder dissolved in purified N-methylpyrrolidone (NMP) to a concentration of up to about 8 wt % under nitrogen atmosphere. The number-average molecular weight of the poly-o-anisidine obtained from the GPC measurement of the solution was about 15,000 as calculated using polystyrene as a molecular-weight standard material.

Next, a positive electrode comprising poly-o-anisidine and solid polymer electrolyte was fabricated in the same manner as in Example 28 except that 8 wt % of the poly-o-anisidine/NMP solution was used instead of the 5 wt % polyaniline/NMP solution used in Example 28.

EXAMPLE 31

Fabrication of secondary battery comprising poly-o-anisidine, lithium and solid polymer electrolyte A solid-state lithium/poly-o-anisidine secondary battery was produced in the same manner as in Example 29 except that the positive electrode comprising poly-o-anisidine (62 mg) prepared in Example 30 was used instead of the polyaniline electrode.

This battery was subjected to repeated charging and discharging at an operating vol, rage of 1.8 to 3.8 V and at a constant current density of 0.1 mA. As a result, it revealed that the maximum discharge capacity was 1.1 mAh, and a cycle life until the capacity decreased to 50% was 210 times.

EXAMPLE 32

Fabrication of a secondary battery comprising graphite fiber, polyaniline and solid polymer electrolyte A solid-state vapor phase graphite fiber/polyaniline secondary battery was produced in the same manner as in Example 29 except that the vapor phase graphite negative electrode prepared in Example 25 was used instead of the lithium foil.

This battery was subjected to repeated charging and discharging at an operating voltage of 1.5 to 3.8 V and at a constant current density of 0.1 mA. As a result, it revealed that the maximum discharge capacity was 1.5 mAh, and a cycle life until the capacity decreased to 50% was 300 times.

EXAMPLE 33

Production of polymerizable monomer mixture 2.10 g of MCOA (550) and 0.51 g of ACAC (600) synthesized in Examples 5 and 6, 1.6 g of propylene carbonate (PC), 1.6 g of ethylene carbonate (EC) and 0.90 g of ethyltributylammnonium perchlorate (EBAP) were mixed well under argon atmosphere to produce a polymerizable monomer mixture comprising MCOA(550)/ACAC(600)/PC/EC/EBAP as a viscous liquid.

Under argon atmosphere, the polymerizable monomer mixture was applied on a glass plate, and heated at 100° C. for 1 hour to produce an MCOA (550)/ACAC (600) copolymer (one of the above-mentioned (M)ACE polymer)/PC/EC/EBPA composite as a transparent, free-standing film of about 300 μm thickness. The ionic conductivities of the film measured at 25° C. and −10° C. by an impedance method were $3.0 \times 10^{-3}$ S/cm and $1.0 \times 10^{-3}$ S/cm, respectively.

EXAMPLE 34

Production of an activated carbon electrode

Coconut shell activated carbon and the polymerizable monomer mixture prepared in Example 33 were mixed in a proportion by weight of 1:1 under an argon atmosphere, and the mixture was applied on a stainless steel foil to an area of 1 cm×1 cm and a thickness of about 150 μm. Further, the coated foil was heated at about 100° C. for 1 hour for polymerization to produce an activated carbon/solid polymer electrolyte composite electrode (13 mg).

EXAMPLE 35

Fabrication of a solid-state electric double layer capacitor

In a glove box under an argon atmosphere, the activated carbon electrode (13 mg) of an area of 1 cm×1 cm produced in Example 34 was covered with a polyimide film of 10 μm thick as a spacer at each edge portion (1 mm width) thereof. Next, the polymerizable monomer mixture (15 mg) produced in Example 33 was applied on the electrode, and then another electrode was tightly fitted thereto. The resulting frame was heated at 100° C. for 1 hour, and the edge portions of the battery were sealed with an epoxy resin to produce a solid-state electric double layer capacitor having a cross-sectional structure as shown in FIG. 3.

This capacitor was subjected to repeated charging and discharging at an operating voltage of 0 to 2.5 V and at a current of 0.1 mA. As a result, it revealed that the maximum discharge capacity was 200 mF. When the charging and discharging were repeated 50 times under this conditions there was no substantial change in the capacity.

EXAMPLE 36

Fabrication of a solid-state electric double layer capacitor

A polymerizable monomer mixture was prepared in the same manner as in Example 33 except that 0.3 g of lithium perchlorate (LiClO$_4$) was used instead of the salt EBAP.

A solid electric double layer capacitor was fabricated in the same manner as in Example 35 except that the polymerizable monomer mixture thus obtained was used.

This capacitor was subjected to repeated charging and discharging at an operation voltage of 0 to 2.0 V and at a current of 0.1 mA. As a result, it revealed that the maximum discharge capacity was 150 mF. When the charging and discharging were repeated 50 times under this condition, there was no substantial change in the capacity.

EXAMPLE 37

Production of an acetylene black electrode

Acetylene black and the polymerizable monomer mixture used in Example 33 were mixed in a proportion by weight of 6:4 under an argon atmosphere, and the resulting mixture was applied on a stainless steel foil to an area of 1 cm×1 cm and a thickness of about 150 μm. Further, the coated foil was heated at about 100° C. for 1 hour for polymerization to produce an electrode comprising acetylene black and solid polymer electrolyte (14 mg).

EXAMPLE 38

Fabrication of a solid-state electric double layer capacitor

A solid-state electric double layer capacitor was fabricated in the same manner as in Example 35 except that the electrode (14 mg) comprising acetylene black and solid polymer electrolyte produced in Example 37 was used.

This capacitor was subjected to repeated charging and discharging at an operating voltage of 0 to 2.5 V and at a current of 0.1 mA. As a result, it revealed that the maximum discharge capacity was 50 mF. When the charging and discharging were repeated 50 times under this condition, there was no substantial change in the capacity.

INDUSTRIAL APPLICABILITY

The solid polymer electrolyte of the present invention comprises a composite comprising of a polymer having a side chain of oxyalkyl group containing urethane bonding and at least one electrolyte, and is characterized in that it can be readily formed in a thin film having a good film strength and a high ionic conductivity.

A battery and a capacitor using the solid polymer electrolyte of the present invention does not suffer from the danger of leakage of the liquid since the ionic conducting substance thereof is solid and therefore it can be used with stability for a long time. The use of this solid polymer electrolyte enables fabrication of a thin battery and a thin capacitor.

The electrode of the present invention comprising a polymer having a side chain of oxyalkyl group containing urethane bonding and an electroactive substance such as aniline-based polymer soluble in an organic solvent, other electroconductive polymer, metal oxide, metal sulfide and carbon material or polarizable material and the manufacturing process of the same provide an electrode having a high electrochemical activity and flexibility, especially a thin electrode having such properties. Accordingly, the electrode of the present invention is useful in providing electrodes usable in various batteries and electric double layer capacitors and the process for manufacturing the same.

Further, the battery of the present invention not only can operate at a high capacity and a large current as a whole solid type, but also can give good cyclability and assure excellent safety and reliability. Therefore, the battery of the present invention can be used as a power source for electric products such as a main power source for portable devices, as a backup power source, as well as a power source of large capacity for such as electric automobiles, road leveling, etc. Since it can be made into a thin film with ease, the battery of the present invention can be used as a paper battery such as one for identification card, etc.

Further, the solid-state electric double layer capacitor of the present invention, as compared with conventional whole solid-state electric double layer capacitors, can operate at a high capacity and a large current as a whole solid type, but also can give good cyclability and assure excellent safety and reliability and provides whole solid type electric double layer capacitor having such features. Therefore, it can be used not only as a backup power source but also as a power source for various electric products when used in combination with a small battery. Since the capacitor of the present invention is excellent in processability such as rendering into a thin film, it is expected to be used in various applications other than those developed by conventional solid-state electric double layer capacitors.

We claim:

1. A solid polymer electrolyte comprising a composite of:
   (a) a polymeric component, wherein said polymeric component comprises at least one member selected from the group consisting of:
      (i) a homopolymer of a 2-acryloyloxyethylcarbamic acid ester monomer,
      (ii) a homopolymer of a 2-methacryloyloxyethylcarbamic acid ester monomer, and
      (iii) a copolymer comprising at least one monomer selected from the group consisting of a 2-acryloyloxyethylcarbamic acid ester, and a 2-methacryloyloxyethylcarbamic acid ester, wherein said 2-acryloyloxyethylcarbamic acid ester is represented by formula (I):

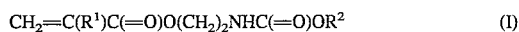

wherein
   $R^1$ represents hydrogen;
   $R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

wherein
   $R^{1'}$ represents methyl;
   $R^{2'}$ represents an organic chain containing at least one oxyalkylene group, wherein said organic chain may be linear, branched or cyclic, and may contain one or more atoms other than carbon, hydrogen or oxygen; and
   (b) at least one electrolyte salt.

2. A solid polymer electrolyte comprising a composite of:
   (a) a polymeric component, wherein said polymeric component comprises at least one member selected from the group consisting of:
      (i) a homopolymer of a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkylester, 2-acryloyloxyethylcarbamic acid 2-acryloyloxyethylcarbamoyloligooxyalkyl ester, and 2-acryloyloxyethylcarbamic acid 2-methacryloyloxyethylcarbamoyloligooxyalkylester, wherein said monomer is represented by general formula (II):

wherein
   $R^1$ represents a hydrogen or a methyl group;
   $R^3$ represents $-(CH_2)_2-$ or $-CH(CH_3)CH_2-$;
   $R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$; and
   n is an integer of 1 or more;
      (ii) a homopolymer of a monomer represented by formula (III):

$$CH_2=C(R^1)C(=O)O(CH_2)_2NHC(=O)O\{(R^6O)_mC(=O)-NHR^5NHC(=O)\}_k(R^3O)_nR^4 \quad (III)$$

wherein $R^1$ represents a hydrogen or a methyl group;

$R^3$ and $R^6$ each represent $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$;

$R^5$ represents an alkylene, allylene, arylene or oxyalkylene group having 1 to 20 carbon atoms; and n, m and k each represent an integer of 1 or more; and (iii) a copolymer comprising at least one monomer selected from the group consisting of a monomer represented by formula (II) and a monomer represented by formula (III); and (b) at least one electrolyte salt.

3. A solid polymer electrolyte comprising a composite of:

(a) a polymeric component, wherein said polymeric component comprises at least one member selected from the group consisting of:

(i) a homopolymer of a 2-acryloyloxyethylcarbamic acid ester monomer, (ii) a homopolymer of a 2-methacryloyloxyethylcarbamic acid ester monomer, and (iii) a copolymer comprising at least one monomer selected from the group consisting of a 2-acryloyloxyethylcarbamic acid ester, and a 2-methacryloyloxyethylcarbamic acid ester, wherein said 2-acryloyloxyethylcarbamic acid ester is represented by formula (I):

$$CH_2=C(R^1)C(=O)O(CH_2)_2NHC(=O)OR^2 \quad (I)$$

wherein $R^1$ represents a hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^{1'})C(=O)O(CH_2)_2NHC(=O)OR^{2'} \quad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen; and (b) at least one electrolyte salt, wherein said electrolyte salt is at least one compound selected from an alkali metal salt, a quaternary ammonium salt, a quaternary phosphonium salt and a transition metal salt.

4. A solid polymer electrolyte comprising a composite of:

(a) a polymeric component, wherein said polymeric component comprises at least one member selected from the group consisting of:

(i) a homopolymer of a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid, 2-methacryloyloxyethylcarbamoyloligooxyalkylester, 2-acryloyloxyethylcarbamic acid, 2-acryloyloxyethylcarbamoyloligooxyalkyl ester, and 2-acryloyloxyethylcarbamic acid 2-methacryloyloxyethylcarbamoyloligooxyalkyl ester, wherein said monomer is represented by general formula (II):

$$CH_2=C(R^1)C(=O)O(CH_2)_2NHC(=O)O(R^3O)_nR^4 \quad (II)$$

wherein $R^1$ represents a hydrogen or a methyl group;

$R^3$ represents $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$; and n is an integer of 1 or more;

(ii) a homopolymer of a monomer represented by formula (III):

$$CH_2=C(R^1)C(=O)O(CH_2)_2NHC(=O)O\{(R^6O)_mC(=O)-NHR^5NHC(=O)\}_k(R^3O)_nR^4 \quad (III)$$

wherein $R^1$ represents a hydrogen or a methyl group;

$R^3$ and $R^6$ each represents $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$;

$R^5$ represents an alkylene, allylene, arylene or oxyalkylene group having 1 to 20 carbon atoms; and n, m and k each represents an integer of 1 or more; and (iii) a copolymer comprising at least one monomer selected from the group consisting of a monomer represented by formula (II) and a monomer represented by formula (III); and (b) at least one electrolyte salt, wherein said electrolyte salt is at least one compound selected from an alkali metal salt, a quaternary ammonium salt, a quaternary phosphonium salt and a transition metal salt.

5. A solid polymer electrolyte comprising a composite of:

(a) a polymeric component, wherein said polymeric component comprises at least one member selected from the group consisting of:

(i) a homopolymer of a 2-acryloyloxyethylcarbamic acid ester monomer, (ii) a homopolymer of a 2-methacryloyloxyethylcarbamic acid ester monomer, and (iii) a copolymer comprising at least one monomer selected from the group consisting of a 2-acryloyloxyethylcarbamic acid ester, and a 2-methacryloyloxyethylcarbamic acid ester, wherein said 2-acryloyloxyethylcarbamic acid ester is represented by formula (I):

$$CH_2=C(R^1)C(=O)O(CH_2)_2NHC(=O)OR^2 \quad (I)$$

wherein $R^1$ represents a hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^{1'})C(=O)O(CH_2)_2NHC(=O)OR^{2'} \quad (I')$$

wherein

R$^{1'}$ represents methyl;

R$^{2'}$ represents an organic chain containing at least one oxyalkylene group, wherein said organic chain may be linear, branched or cyclic, and may contain one or more atoms other than carbon, hydrogen or oxygen; and (b) at least one electrolyte salt, wherein said solid polymer electrolyte further contains a plasticizer.

6. A solid polymer electrolyte comprising a composite of:
(a) a polymeric component, wherein said polymeric component comprises at least one member selected from the group consisting of:
  (i) a homopolymer of a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkyl ester, 2-acryloyloxyethylcarbamic acid, 2-acryloyloxyethylcarbamoyloligooxyalkyl ester, and 2-acryloyloxyethylcarbamic acid, 2-methacryloyloxyethylcarbamoyloligooxyalkylester, wherein said monomer is represented by general formula (II):

$$CH_2=C(R^1)C(=O)O(CH_2)_2NHC(=O)O(R^3O)_nR^4 \quad (II)$$

wherein

R$^1$ represents a hydrogen or a methyl group;

R$^3$ represents —(CH$_2$)$_2$— or —CH(CH$_3$)CH$_2$—;

R$^4$ represents an alkyl group having 1 to 10 carbon atoms, —C(=O)NH(CH$_2$)$_2$OC(=O)CH=CH$_2$ or —C(=O)NH(CH$_2$)$_2$OC(=O)C(CH$_3$)=CH$_2$; and n is an integer of 1 or more;

(ii) a homopolymer of a monomer represented by formula (III):

$$CH_2=C(R^1)C(=O)O(CH_2)_2NHC(=O)O\{(R^6O)_mC(=O)NHR^5NHC(=O)O\}_k(R^3O)_nR^4 \quad (III)$$

wherein

R$^1$ represents a hydrogen or a methyl group;

R$^3$ and R$^6$ each represents —(CH$_2$)$_2$— or —CH(CH$_3$)CH$_2$—;

R$^4$ represents an alkyl group having 1 to 10 carbon atoms, —C(=O)NH(CH$_2$)$_2$OC(=O)CH=CH$_2$ or —C(=O)NH(CH$_2$)$_2$OC(=O)C(CH$_3$)=CH$_2$;

R$^5$ represents an alkylene, allylene, arylene or oxyalkylene group having 1 to 20 carbon atoms; and n, m and k each represents an integer of 1 or more; and (iii) a copolymer comprising at least one monomer selected from the group consisting of a monomer represented by formula (II) and a monomer represented by formula (III); and (b) at least one electrolyte salt, wherein said solid polymer electrolyte further contains a plasticizer.

7. A solid polymer electrolyte comprising: a composite of:
(a) a polymeric component, wherein said polymeric component comprises at least one member selected from the group consisting of:
  (i) a homopolymer of a 2-acryloyloxyethylcarbamic acid ester monomer,
  (ii) a homopolymer of a 2-methacryloyloxyethylcarbamic acid ester monomer, and
  (iii) a copolymer comprising at least one monomer selected from the group consisting of a 2-acryloyloxyethylcarbamic acid ester, and a 2-methacryloyloxyethylcarbamic acid ester, wherein said 2-acryloyloxyethylcarbamic acid ester is represented by formula (I):

$$CH_2=C(R^1)C(=O)O(CH_2)_2NHC(=O)OR^2 \quad (I)$$

wherein

R$^1$ represents a hydrogen;

R$^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^{1'})C(=O)O(CH_2)_2NHC(=O)OR^{2'} \quad (I')$$

wherein

R$^{1'}$ represents methyl;

R$^{2'}$ represents an organic chain containing at least one oxyalkylene group, wherein said organic chain may be linear, branched or cyclic, and may contain one or more atoms other than carbon, hydrogen or oxygen; and (b) at least one electrolyte salt, wherein said electrolyte salt is at least one compound selected from an alkali metal salt, a quaternary ammonium salt, a quaternary phosphonium salt and a transition metal salt, wherein said solid polymer electrolyte further contains a plasticizer.

8. A solid polymer electrolyte comprising a composite of:
(a) a polymeric component, wherein said polymeric component comprises at least one member selected from the group consisting of:
  (i) a homopolymer of a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid, 2-methacryloyloxyethylcarbamoyloligooxyalkyl ester, 2-acryloyloxyethylcarbamic acid, 2-acryloyloxyethylcarbamoyloligooxyalkyl ester, and 2-acryloyloxyethylcarbamic acid 2-methacryloyloxyethylcarbamoyloligooxyalkylester, wherein said monomer is represented by general formula (II):

$$CH_2=C(R^1)C(=O)O(CH_2)_2NHC(=O)O(R^3O)_nR^4 \quad (II)$$

wherein

R$^1$ represents a hydrogen or a methyl group;

R$^3$ represents —(CH$_2$)$_2$— or —CH(CH$_3$)CH$_2$—;

R$^4$ represents an alkyl group having 1 to 10 carbon atoms, —C(=O)NH(CH$_2$)$_2$OC(=O)CH=CH$_2$ or —C(=O)NH(CH$_2$)$_2$OC(=O)C(CH$_3$)=CH$_2$; and n is an integer of 1 or more;

(ii) a homopolymer of a monomer represented by formula (III):

$$CH_2=C(R^1)C(=O)O(CH_2)_2NHC(=O)O\{(R^6O)_mC(=O)NHR^5NHC(=O)O\}_k(R^3O)_nR^4 \quad (III)$$

wherein

R$^1$ represents a hydrogen or a methyl group;

R$^3$ and R$^6$ each represents —(CH$_2$)$_2$— or —CH(CH$_3$)CH$_2$—;

R$^4$ represents an alkyl group having 1 to 10 carbon atoms, —C(=O)NH(CH$_2$)$_2$OC(=O)CH=CH$_2$ or —C(=O)NH(CH$_2$)$_2$OC(=O)C(CH$_3$)=CH$_2$;

$R^5$ represents an alkylene, allylene, arylene or oxyalkylene group having 1 to 20 carbon atoms; and n, m and k each represents an integer of 1 or more; and (iii) a copolymer comprising at least one monomer selected from the group consisting of a monomer represented by formula (II) and a monomer represented by formula (III); and (b) at least one electrolyte salt, wherein said electrolyte salt is at least one compound selected from an alkali metal salt, a quaternary ammonium salt, a quaternary phosphonium salt and a transition metal salt, wherein said solid polymer electrolyte further contains a plasticizer.

9. A battery which comprises the solid polymer electrolyte as claimed in any one of claims 1 to 8.

10. A lithium battery which comprises the negative electrode comprising lithium or lithium alloy and the solid polymer electrolyte as claimed in any one of claims 1 to 8.

11. A lithium ion battery which comprises the negative electrode comprising a carbon material which can occlude and discharge lithium ion and the solid polymer electrolyte as claimed in any one of claims 1 to 8.

12. A battery which comprises a positive electrode comprising (i) an aniline-based polymer soluble in an organic solvent or other electroconductive polymer, a metal oxide, a metal sulfide or a carbon material; and (ii) a solid polymer electrolyte as claimed in any one of claims 1 to 8.

13. An electrode comprising:

(a) a polymeric component, wherein said polymeric component comprises at least one member selected from the group consisting of:
(i) a homopolymer of a 2-acryloyloxyethylcarbamic acid ester monomer, and
(ii) a homopolymer of a 2-methacryloyloxyethylcarbamic acid ester monomer, wherein said 2-acryloyloxyethylcarbamic acid ester is represented by formula (I):

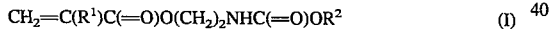

$$CH_2=C(R^1)C(=O)O(CH_2)_2NHC(=O)OR^2 \quad (I)$$

wherein $R^1$ represents hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

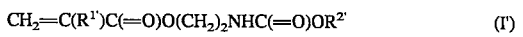

$$CH_2=C(R^{1'})C(=O)O(CH_2)_2NHC(=O)OR^{2'} \quad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen; and (b) at least one electroactive substance or polarizable material.

14. An electrode comprising:

(a) a polymeric component, wherein said polymeric component comprises at least one member selected from the group consisting of:
(i) a homopolymer of a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkyl ester, 2-acryloyloxyethylcarbamic acid 2-acryloyloxyethylcarbamoyloligooxyalkyl ester, and 2-acryloyloxyethylcarbamic acid 2-methacryloyloxyethylcarbamoyloligooxyalkyl ester, wherein said monomer is represented by general formula (II):

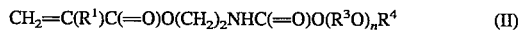

$$CH_2=C(R^1)C(=O)O(CH_2)_2NHC(=O)O(R^3O)_nR^4 \quad (II)$$

wherein $R^1$ represents a hydrogen or a methyl group;

$R^3$ represents $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$; and n is an integer of 1 or more;

(ii) a homopolymer of a monomer represented by formula (III):

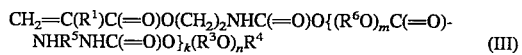

$$CH_2=C(R^1)C(=O)O(CH_2)_2NHC(=O)O\{(R^6O)_mC(=O)-NHR^5NHC(=O)O\}_k(R^3O)_nR^4 \quad (III)$$

wherein $R^1$ represents a hydrogen or a methyl group;

$R^3$ and $R^6$ each represent $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$;

$R^5$ represents an alkylene, allylene, arylene or oxyalkylene group having 1 to 20 carbon atoms; and n, m and k each represent an integer of 1 or more; and (iii) a copolymer comprising at least one monomer selected from the group consisting of a monomer represented by formula (II) and a monomer represented by formula (III); and (b) at least one electroactive substance or polarizable material.

15. The electrode as claimed in claim 13 or 14, wherein said electroactive substance or polarizable material comprises an aniline-based polymer soluble in an organic solvent or other electroconductive polymer, a metal oxide, a metal sulfide or a carbon material.

16. A process for manufacturing an electrode which comprises the steps of:

(A) mixing
(a) a monomer component, wherein said monomer component comprises at least one member selected from the group consisting of:
(i) a 2-acryloyloxyethylcarbamic acid ester, and
(ii) a 2-methacryloyloxyethylcarbamic acid ester, wherein said 2-acryloyloxyethylcarbamic acid ester is represented by formula (I):

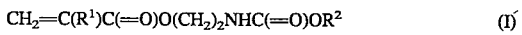

$$CH_2=C(R^1)C(=O)O(CH_2)_2NHC(=O)OR^2 \quad (I)$$

wherein $R^1$ represents hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^{1'})C(=O)O(CH_2)_2NHC(=O)OR^{2'} \quad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen; and (b) at least one electroactive substance or polymerizable material, to obtain a polymerizable monomer mixture; and (B) polymerizing the polymerizable monomer mixture in a form to obtain the electrode.

17. A process for manufacturing an electrode which comprises the steps of:

(A) mixing (a) a monomer component, wherein said monomer component comprises at least one member selected from the group consisting of:

(i) a 2-acryloyloxyethylcarbamic acid ester, and (ii) a 2-methacryloyloxyethylcarbamic acid ester, wherein said 2-acryloyloxyethylcarbamic acid ester is represented by formula (I):

$$CH_2=C(R^1)C(=O)O(CH_2)_2NHC(=O)OR^2 \quad (I)$$

wherein $R^1$ represents hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^1)C(=O)O(CH_2)_2NHC(=O)OR^{2'} \quad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen;

(b) at least one electroactive substance or polymerizable material; and (c) a plasticizer, to obtain a polymerizable monomer mixture; and (B) polymerizing the polymerizable monomer mixture in a form to obtain the electrode.

18. A process for manufacturing an electrode which comprises the steps of:

(A) mixing (a) a monomer component, wherein said monomer component comprises at least one member selected from the group consisting of:

(i) a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkyl ester, 2-acryloyloxyethylcarbamic acid 2-acryloyloxyethylcarbamoyloligooxyalkyl ester, and 2-acryloyloxyethylcarbamic acid 2-methacryloyloxyethylcarbamoyloligooxyalkyl ester, wherein said monomer is represented by general formula (II):

$$CH_2=C(R^1)C(=O)O(CH_2)_2NHC(=O)O(R^3O)_nR^4 \quad (II)$$

wherein $R^1$ represents a hydrogen or a methyl group;

$R^3$ represents $-(CH_2)_2-$ or $-CH(CH_3)CH_2-$; $R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$; and n is an integer of 1 or more; and (ii) a monomer represented by formula (III):

$$CH_2=C(R^1)C(=O)O(CH_2)_2NHC(=O)O\{(R^6O)_mC(=O)NHR^5NHC(=O)O\}_k(R^3O)_nR^4 \quad (III)$$

wherein $R^1$ represents a hydrogen or a methyl group;

$R^3$ and $R^6$ each represent $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$;

$R^5$ represents an alkylene, allylene, arylene or oxyalkylene group having 1 to 20 carbon atoms; and n, m and k each represent an integer of 1 or more; and (b) at least one electroactive substance or polarizable material; to obtain a polymerizable monomer mixture; and (B) polymerizing the polymerizable monomer mixture in a form to obtain the electrode.

19. A process for manufacturing an electrode which comprises the steps of:

(A) mixing (a) a monomer component, wherein said monomer component comprises at least one member selected from the group consisting of:

(i) a monomer selected from the group consisting of: 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkyl ester, 2-acryloyloxyethylcarbamic acid 2-acryloyloxyethylcarbamoyloligooxyalkyl ester, and 2-acryloyloxyethylcarbamic acid 2-methacryloyloxyethylcarbamoyloligooxyalkyl ester, wherein said monomer is represented by general formula (II):

$$CH_2=C(R^1)C(=O)O(CH_2)_2NHC(=O)O(R^3O)_nR^4 \quad (II)$$

wherein $R^1$ represents a hydrogen or a methyl group;

$R^3$ represents $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$; and n is an integer of 1 or more; and (ii) a monomer represented by formula (III):

$$CH_2=C(R^1)C(=O)O(CH_2)_2NHC(=O)O\{(R^6O)_mC(=O)NHR^5NHC(=O)O\}_k(R^3O)_nR^4 \quad (III)$$

wherein $R^1$ represents a hydrogen or a methyl group;

$R^3$ and $R^6$ each represent $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$;

$R^5$ represents an alkylene, allylene, arylene or oxyalkylene group having 1 to 20 carbon atoms; and n, m and k each represent an integer of 1 or more;
(b) at least one electroactive substance or polarizable material; and
(c) a plasticizer, to obtain a polymerizable monomer mixture; and (B) polymerizing the polymerizable monomer mixture in a form to obtain the electrode.

20. A process for manufacturing an electrode as claimed in any one of claims 16 to 19, wherein the electroactive substance or polarizable material comprises an aniline-based polymer soluble in an organic solvent or other electroconductive polymer, a metal oxide, a metal sulfide or a carbon material.

21. A process for manufacturing a battery which comprises the steps of:

(A) placing a polymerizable monomer mixture in a frame for construction of a battery or on a support, wherein said frame comprises two electrodes that are not in contact with each other, and (B) polymerizing said polymerizable monomer mixture, wherein said mixture comprising
(a) at least one monomer selected from the group consisting of:
(i) a 2-acryloyloxyethylcarbamic acid ester, and
(ii) a 2-methacryloyloxyethylcarbamic acid ester, wherein said 2-acryloyloxyethylcarbamic acid ester is represented by formula (I):

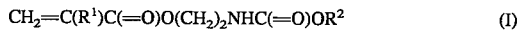
$$CH_2=C(R^1)C(=O)O(CH_2)_2NHC(=O)OR^2 \qquad (I)$$

wherein $R^1$ represents hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

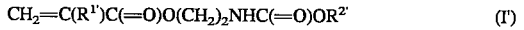
$$CH_2=C(R^{1'})C(=O)O(CH_2)_2NHC(=O)OR^{2'} \qquad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen; and
(b) at least one electrolyte salt.

22. A process for manufacturing a battery which comprises the steps of:

(A) placing a polymerizable monomer mixture in a frame for construction of a battery or on a support, wherein said frame comprises two electrodes that are not in contact with each other, and (B) polymerizing said polymerizable monomer mixture, wherein said mixture comprises
(a) a monomer component wherein said monomer component comprises at least one member selected from the group consisting of:

(i) a monomer selected from the group consisting of: 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkyl ester, 2-acryloyloxyethylcarbamic acid 2-acryloyloxyethylcarbamoyloligooxyalkyl ester, and 2-acryloyloxyethylcarbamic acid 2-methacryloyloxyethylcarbamoyloligooxyalkyl ester, wherein said monomer is represented by general formula (II):

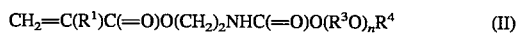
$$CH_2=C(R^1)C(=O)O(CH_2)_2NHC(=O)O(R^3O)_nR^4 \qquad (II)$$

wherein $R^1$ represents a hydrogen or a methyl group;

$R^3$ represents $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$; and n is an integer of 1 or more;

(ii) a monomer represented by formula (III):

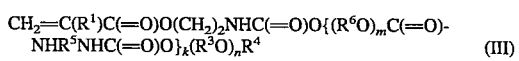
$$CH_2=C(R^1)C(=O)O(CH_2)_2NHC(=O)O\{(R^6O)_mC(=O)NHR^5NHC(=O)O\}_k(R^3O)_nR^4 \qquad (III)$$

wherein $R^1$ represents a hydrogen or a methyl group;

$R^3$ and $R^6$ each represent $-(CH_2)_2-$ or $-CH(CH_3)CH_2-$;

$R^4$ represents an alkyl group having 1 to 10 carbon atoms, $-C(=O)NH(CH_2)_2OC(=O)CH=CH_2$ or $-C(=O)NH(CH_2)_2OC(=O)C(CH_3)=CH_2$;

$R^5$ represents an alkylene, allylene, arylene or oxyalkylene group having 1 to 20 carbon atoms; and n, m and k each represent an integer of 1 or more; and
(b) at least one electrolyte salt.

23. An electric double layer capacitor comprising polarizable electrodes and an ionic conducting substance arranged between the electrodes, wherein said ionic conducting substance comprises the solid polymer electrolyte claimed in any one of claims 1 to 8.

24. An electric double layer capacitor comprising polarizable electrodes and an ionic conducting substance arranged between the electrodes, said polarizable electrodes comprising a carbon material and a polymeric component, wherein said polymeric component comprises at least one member selected from the group consisting of:

(a) a homopolymer of a 2-acryloyloxyethylcarbamic acid ester monomer, (b) a homopolymer of a 2-methacryloyloxyethylcarbamic acid ester monomer, and (c) a copolymer comprising at least one monomer selected from the group consisting of a 2-acryloyloxyethylcarbamic acid ester, and a 2-methacryloyloxyethylcarbamic acid ester, wherein said 2-acryloyloxyethylcarbamic acid ester is represented by formula (I):

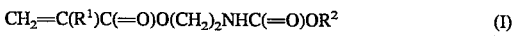
$$CH_2=C(R^1)C(=O)O(CH_2)_2NHC(=O)OR^2 \qquad (I)$$

wherein $R^1$ represents hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^{1'})C(=O)O(CH_2)_2NHC(=O)OR^{2'} \qquad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen.

25. An electric double layer capacitor comprising polarizable electrodes and an ionic conducting substance arranged between the electrodes, said polarizable electrodes comprising a carbon material and a polymeric component, wherein said polymeric component comprises at least one member selected from the group consisting of:

(a) a homopolymer of a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkyl ester, 2-acryloyloxyethylcarbamic acid 2-acryloyloxyethylcarbamoyloligooxyalkyl ester, and 2-acryloyloxyethylcarbamic acid 2-methacryloyloxyethylcarbamoyloligooxyalkyl ester wherein said monomer is represented by general formula (II):

$$CH_2=C(R^1)C(=O)O(CH_2)_2NHC(=O)O(R^3O)_nR^4 \qquad (II)$$

wherein $R^1$ represents a hydrogen or a methyl group;

$R^3$ represents —$(CH_2)_2$— or —$CH(CH_3)CH_2$—;

$R^4$ represents an alkyl group having 1 to 10 carbon atoms, —$C(=O)NH(CH_2)_2OC(=O)CH=CH_2$ or —$C(=O)NH(CH_2)_2OC(=O)C(CH_3)=CH_2$; and n is an integer of 1 or more;

(b) a homopolymer of a monomer represented by formula (III):

$$CH_2=C(R^1)C(=O)O(CH_2)_2NHC(=O)O\{(R^6O)_mC(=O)NHR^5NHC(=O)O\}_k(R^3O)_nR^4 \qquad (III)$$

wherein $R^1$ represents a hydrogen or a methyl group;

$R^3$ and $R^6$ each represent —$(CH_2)_2$— or —$CH(CH_3)CH_2$—;

$R^4$ represents an alkyl group having 1 to 10 carbon atoms, —$C(=O)NH(CH_2)_2OC(=O)CH=CH_2$ or —$C(=O)NH(CH_2)_2OC(=O)C(CH_3)=CH_2$;

$R^5$ represents an alkylene, allylene, arylene or oxyalkylene group having 1 to 20 carbon atoms; and n, m and k each represent an integer of 1 or more; and (c) a copolymer comprising at least one monomer selected from the group consisting of a monomer represented by formula (II) and a monomer represented by formula (III).

26. An electric double layer capacitor comprising polarizable electrodes and an ionic conducting substance arranged between the electrodes, wherein said polarizable electrodes are manufactured by polymerizing a polymerizable monomer mixture comprising a carbon material and at least one monomer selected from the group consisting of:

(a) a 2-acryloyloxyethylcarbamic acid ester monomer, and (b) a 2-methacryloyloxyethylcarbamic acid ester, wherein said 2-acryloyloxyethylcarbamic acid ester is represented by formula (I):

$$CH_2=C(R^1)C(=O)O(CH_2)_2NHC(=O)OR^2 \qquad (I)$$

wherein $R^1$ represents hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^{1'})C(=O)O(CH_2)_2NHC(=O)OR^{2'} \qquad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen.

27. An electric double layer capacitor comprising polarizable electrodes and an ionic conducting substance arranged between the electrodes, wherein said polarizable electrodes are manufactured by polymerizing a polymerizable monomer mixture comprising a carbon material and at least one monomer selected from the group consisting of:

(a) a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkyl ester, 2-acryloyloxyethylcarbamic acid 2-acryloyloxyethylcarbamoyloligooxyalkyl ester, and 2-acryloyloxyethylcarbamic acid 2-methacryloyloxyethylcarbamoyloligooxyalkyl ester, wherein said monomer is represented by general formula (II):

$$CH_2=C(R^1)C(=O)O(CH_2)_2NHC(=O)O(R^3O)_nR^4 \qquad (II)$$

wherein $R^1$ represents a hydrogen or a methyl group;

$R^3$ represents —$(CH_2)_2$— or —$CH(CH_3)CH_2$—;

$R^4$ represents an alkyl group having 1 to 10 carbon atoms, —$C(=O)NH(CH_2)_2OC(=O)CH=CH_2$ or —$C(=O)NH(CH_2)_2OC(=O)C(CH_3)=CH_2$; and n is an integer of 1 or more; and (b) a monomer represented by formula (III):

$$CH_2=C(R^1)C(=O)O(CH_2)_2NHC(=O)O\{(R^6O)_mC(=O)NHR^5NHC(=O)O\}_k(R^3O)_nR^4 \qquad (III)$$

wherein $R^1$ represents a hydrogen or a methyl group;

$R^3$ and $R^6$ each represent —$(CH_2)_2$— or —$CH(CH_3)CH_2$—;

$R^4$ represents an alkyl group having 1 to 10 carbon atoms, —$C(=O)NH(CH_2)_2OC(=O)CH=CH_2$ or —$C(=O)NH(CH_2)_2OC(=O)C(CH_3)=CH_2$;

$R^5$ represents an alkylene, allylene, arylene or oxyalkylene group having 1 to 20 carbon atoms; and n, m and k each represent an integer of 1 or more.

28. A process for manufacturing an electric double layer capacitor which comprises the steps of:

(A) placing a polymerizable monomer mixture in a frame for construction of an electric double layer capacitor or on a support, wherein said frame comprises two electrodes that are not in contact with each other, and (B) polymerizing said polymerizable monomer mixture, wherein said mixture comprises (a) at least one monomer selected from the group consisting of:
(i) a 2-acryloyloxyethylcarbamic acid ester, and
(ii) a 2-methacryloyloxyethylcarbamic acid ester, wherein said 2-acryloyloxyethylcarbamic acid ester is represented by formula (I):

$$CH_2=C(R^1)C(=O)O(CH_2)_2NHC(=O)OR^2 \qquad (I)$$

wherein $R^1$ represents hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^{1'})C(=O)O(CH_2)_2NHC(=O)OR^{2'} \qquad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen; and (b) at least one electrolyte salt.

29. A process for manufacturing an electric double layer capacitor which comprises the steps of:

(A) placing a polymerizable monomer mixture in a frame for construction of an electric double layer capacitor or on a support, wherein said frame comprises two electrodes that are not in contact with each other, and (B) polymerizing said polymerizable monomer mixture, wherein said mixture comprises (a) at least one compound selected from the group consisting of:
(i) a monomer selected from the group consisting of 2-methacryloyloxyethylcarbamic acid ω-alkyloligooxyalkyl ester, 2-acryloyloxyethylcarbamic acid ω-alkyloligooxyalkyl ester, 2-methacryloyloxyethylcarbamic acid 2-methacryloyloxyethylcarbamoyloligooxyalkyl ester, 2-acryloyloxyethylcarbamic acid 2-acryloyloxyethylcarbamoyloligooxyalkyl ester, and 2-acryloyloxyethylcarbamic acid 2-methacryloyloxyethylcarbamoyloligooxyalkyl ester, wherein said monomer is represented by general formula (II):

$$CH_2=C(R^1)C(=O)O(CH_2)_2NHC(=O)O(R^3O)_nR^4 \qquad (II)$$

wherein $R^1$ represents a hydrogen or a methyl group;

$R^3$ represents —$(CH_2)_2$— or —$CH(CH_3)C_2$—;

$R^4$ represents an alkyl group having 1 to 10 carbon atoms, —C(=O)NH(CH_2)_2OC(=O)CH=CH_2 or —C(=O)NH(CH_2)_2OC(=O)C(CH_3)=CH_2; and n is an integer of 1 or more; and (ii) a monomer represented by formula (III):

$$CH_2=C(R^1)C(=O)O(CH_2)_2NHC(=O)O\{(R^6O)_mC(=O)NHR^5NHC(=O)O\}_k(R^3O)_nR^4 \qquad (III)$$

wherein $R^1$ represents a hydrogen or a methyl group;

$R^3$ and $R^6$ each represent —$(CH_2)_2$— or —$CH(CH_3)CH_2$;

$R^4$ represents an alkyl group having 1 to 10 carbon atoms, —C(=O)NH(CH_2)_2OC(=O)CH=CH_2 or —C(=O)NH(CH_2)_2OC(=O)C(CH_3)=CH_2;

$R^5$ represents an alkylene, allylene, arylene or oxyalkylene group having 1 to 20 carbon atoms;

and n, m and k each represent an integer of 1 or more; and (b) at least one electrolyte salt.

30. A process for manufacturing an electric double layer capacitor which comprises the steps of:

(A) arranging a pair of polarizable electrodes so as to face each other, said electrodes comprising a carbon material and a polymeric component, wherein said polymeric component comprises at least one member selected from the group consisting of:
(a) a homopolymer of 2-acryloyloxyethylcarbamic acid ester monomer,
(b) a homopolymer of 2-methacryloyloxyethylcarbamic acid ester monomer, and
(c) a copolymer comprising at least one monomer selected from the group consisting of a 2-acryloyloxyethylcarbamic acid ester, and a 2-methacryloyloxyethylcarbamic acid ester, wherein said 2-acryloyloxyethylcarbamic acid ester is represented by formula (I):

$$CH_2=C(R^1)C(=O)O(CH_2)_2NHC(=O)OR^2 \qquad (I)$$

wherein $R^1$ represents hydrogen;

$R^2$ represents an organic chain containing at least one oxyalkylene group, wherein said organic chain may be linear, branched or cyclic, and may contain one or more atoms other than carbon, hydrogen or oxygen; and wherein said 2-methacryloyloxyethylcarbamic acid ester is represented by formula (I'):

$$CH_2=C(R^{1'})C(=O)O(CH_2)_2NHC(=O)OR^{2'} \qquad (I')$$

wherein $R^{1'}$ represents methyl;

$R^{2'}$ represents an organic chain containing at least one oxyalkylene group, wherein said organic chain may be linear, branched or cyclic, and may contain one or more atoms other than carbon, hydrogen or oxygen; and (B) placing in between said facing electrodes a polymerizable monomer mixture comprising
(a) at least one monomer selected from the group consisting of the 2-acryloyloxyethylcarbamic acid ester and the 2-methacryloyloxyethylcarbamic acid ester; and
(b) at least one electrolyte salt; and (C) polymerizing said polymerizable monomer mixture.

* * * * *

UNITED STATES PATENT AND TRADEMARK OFFICE
CERTIFICATE OF CORRECTION

PATENT NO. : 5,597,661
DATED : 28 January 1997
INVENTOR(S) : Masataka TAKEUCHI et al.

It is certified that error appears in the above-indentified patent and that said Letters Patent is hereby corrected as shown below:

| Claim No. | Column No. | Line No. | Delete | Insert |
|-----------|------------|----------|--------|--------|
| 4 | 31 | 66 | "acid," | -- acid -- |
| 4 | 32 | 1 | "acid," | -- acid -- |
| 6 | 33 | 19 | "acid," | -- acid -- |
| 6 | 33 | 21 | "acid," | -- acid -- |
| 8 | 34 | 38 | "acid," | -- acid -- |
| 8 | 34 | 40 | "acid," | -- acid -- |

Signed and Sealed this

Thirtieth Day of September, 1997

Attest:

BRUCE LEHMAN

*Attesting Officer*        *Commissioner of Patents and Trademarks*